US006967562B2

(12) United States Patent
Menard et al.

(10) Patent No.: US 6,967,562 B2

(45) Date of Patent: Nov. 22, 2005

(54) ELECTRONIC LOCK CONTROL AND SENSOR MODULE FOR A WIRELESS SYSTEM

(75) Inventors: Raymond J. Menard, Hastings, MN (US); McNeil Bryan, Amery, WI (US)

(73) Assignee: Royal Thoughts, LLC, Minneapolis, MN (US)

( * ) Notice: Subject to any disclaimer, the term of this patent is extended or adjusted under 35 U.S.C. 154(b) by 496 days.

(21) Appl. No.: 10/081,142

(22) Filed: Feb. 22, 2002

(65) Prior Publication Data

US 2003/0160681 A1 Aug. 28, 2003

(51) Int. Cl.[7] .......................... G06K 19/00; E05B 1/00; E05B 13/10; E05B 49/00

(52) U.S. Cl. ....................... 340/5.64; 340/5.7; 292/346; 70/221; 70/222; 70/224; 70/278.1

(58) Field of Search ................................ 340/5.64, 5.2, 340/5.22, 5.7; 292/347; 70/221, 222, 223, 224, 277, 278.1, 279.1, 280, 281, 282, 283, 283.1, 472, 278.2

(56) References Cited

U.S. PATENT DOCUMENTS

| | | | | |
|---|---|---|---|---|
| 3,843,841 | A | 10/1974 | Rubinstein | 179/5 P |
| 3,969,709 | A | 7/1976 | Isaacs et al. | 340/224 |
| 4,237,344 | A | 12/1980 | Moore | 179/2 A |
| 4,284,849 | A | 8/1981 | Anderson et al. | 179/5 R |
| 4,303,801 | A | 12/1981 | Anderson et al. | 179/5 R |
| 4,531,527 | A | 7/1985 | Reinhold, Jr. et al. | 128/696 |
| 4,772,876 | A | 9/1988 | Laud | 340/539 |
| 4,789,859 | A | 12/1988 | Clarkson et al. | 340/825.31 |
| 4,843,377 | A | 6/1989 | Fuller et al. | 340/573 |
| 4,856,047 | A | 8/1989 | Saunders | 379/57 |
| 4,908,600 | A | 3/1990 | Martinez | 340/310 R |
| 4,993,059 | A | 2/1991 | Smith et al. | 379/39 |
| 4,994,787 | A | 2/1991 | Kratt et al. | 340/505 |

(Continued)

FOREIGN PATENT DOCUMENTS

| | | |
|---|---|---|
| GB | 2285704 | 7/1995 |
| WO | WO-0025284 A2 | 5/2000 |

OTHER PUBLICATIONS

"Freehand Remote Control Lock", *Remote Control Lock Instruction Manual,* KDL, Inc., (1997), pp. 1–15.

*Skyroute Communications,* http://www.sur–gard.com/sky-route.htm, (1974), pp. 1–4.

"21st Century Emergency Safety Communication Policy", *comCARE Alliance,* http://www.comcare.org/21ct99.htm, (2000), pp. 1-3.

"AlarmNet–A Original Alarmnet", *AlarmNet,* http;//www.a-demco.com/AlarmNet/AlarmNetA.htm,(2000), pp. 1–2.

"AlarmNet–C Control Channel Cellular", *AlarmNet,* http://www.ademco.com/AlarmNet/AlarmNetC.htm, (2000), 2 pages.

(Continued)

*Primary Examiner*—Brian Zimmerman
*Assistant Examiner*—Clara Yang
(74) *Attorney, Agent, or Firm*—Schwegman, Lundberg, Woessner & Kluth, P.A.

(57) ABSTRACT

A lock system includes a cylindrical door lock having a latching spindle and an opening spindle which are concentrically oriented, and a wireless communication system to transmit signals indicating the relative positions of the latching spindle and the opening spindle. A door lock assembly can include a lock mechanism for placing the lock assembly into an unlocked state or a locked state, an electrically controlled actuator assembly to control the lock mechanism, a transceiver coupled to the actuator assembly, and a communication device to communicate over a two-way wireless network with the electrically controlled actuator. A retrofit actuator assembly adapted to be mounted on an existing lock to control a locking mechanism of the lock, and a two-way communication device to control the retrofit actuator assembly and to receive signals from the retrofit actuator assembly indicating a state of the locking mechanism.

21 Claims, 8 Drawing Sheets

U.S. PATENT DOCUMENTS 5,016,172 A 5/1991 Dessertine ............. 364/413.02
5,025,374 A 6/1991 Roizen et al. ......... 364/413.02
5,062,147 A 10/1991 Pickett et al. ............... 364/900
5,081,667 A 1/1992 Drori et al. ................... 379/59
5,128,979 A 7/1992 Reich et al. .................. 379/40
5,179,571 A 1/1993 Schilling ....................... 375/1
5,195,126 A 3/1993 Carrier et al. ................ 379/45
5,223,844 A 6/1993 Mansell et al. ............ 342/357
5,228,449 A 7/1993 Christ et al. ................ 128/691
5,276,728 A 1/1994 Pagliaroli et al. ............. 379/58
5,278,539 A 1/1994 Lauterbach et al. ........ 340/539
5,319,355 A 6/1994 Russek ....................... 340/573
5,319,698 A 6/1994 Glidewell et al. ............ 379/39
5,321,963 A * 6/1994 Goldman ................... 70/278.1
5,333,173 A 7/1994 Seazholtz et al. ............. 379/45
5,343,509 A 8/1994 Dounies
5,351,235 A 9/1994 Lahtinen .................... 370/58.1
5,382,948 A 1/1995 Richmond
5,390,238 A 2/1995 Kirk et al. .................... 379/93
5,398,277 A 3/1995 Martin, Jr. et al.
5,398,782 A 3/1995 Talbot et al. ............... 187/393
5,400,246 A 3/1995 Wilson et al. .............. 364/146
5,402,466 A 3/1995 Delahanty .................... 379/44
5,404,577 A 4/1995 Zuckerman et al. .......... 455/66
5,410,292 A 4/1995 Le Van Suu ........... 340/310.06
5,412,372 A 5/1995 Parkhurst et al. ........... 340/568
5,416,695 A 5/1995 Stutman et al. ........ 364/413.02
5,421,178 A * 6/1995 Hamel et al. ................. 70/283
5,432,841 A 7/1995 Rimer ......................... 379/59
5,451,839 A 9/1995 Rappaport et al. .......... 375/224
5,485,504 A 1/1996 Ohnsorge .................... 379/58
5,486,812 A 1/1996 Todd .......................... 340/539
5,507,162 A 4/1996 Chhatwal ..................... 70/278
5,513,111 A 4/1996 Wortham .................... 364/460
5,552,641 A 9/1996 Fischer et al. ............. 307/10.5
5,568,535 A 10/1996 Sheffer et al. ................ 379/39
5,570,083 A 10/1996 Johnson ...................... 340/692
5,583,831 A 12/1996 Churchill et al. ............. 368/10
5,587,701 A 12/1996 Hess .......................... 340/541
5,630,207 A 5/1997 Gitlin et al. ............... 455/54.1
5,640,147 A 6/1997 Chek et al. ................. 340/573
5,652,564 A 7/1997 Winbush .................... 340/426
5,687,215 A 11/1997 Timm et al. .................. 379/58
5,712,619 A 1/1998 Simkin ....................... 340/539
5,719,551 A 2/1998 Flick .......................... 340/426
5,736,932 A 4/1998 Bulfer et al. .......... 340/825.34
5,739,748 A 4/1998 Flick .......................... 340/426
5,742,233 A 4/1998 Hoffman et al. ............ 340/573
5,752,976 A 5/1998 Duffin et al. ................. 607/32
5,754,111 A 5/1998 Garcia ........................ 340/573
5,777,551 A 7/1998 Hess .......................... 340/541
5,778,315 A 7/1998 Proietti
5,782,118 A * 7/1998 Chamberlain et al. ........ 70/283
5,784,685 A 7/1998 Stanford et al. ........... 455/31.2
5,786,746 A 7/1998 Lombardo et al. ...... 340/286.07
5,793,283 A 8/1998 Davis ......................... 340/426
5,812,536 A 9/1998 Manduely ................... 370/282
5,815,417 A 9/1998 Orr et al. .................... 364/578
5,821,854 A 10/1998 Dorinski et al. ............ 340/539
5,825,283 A 10/1998 Camhi ........................ 340/438
5,845,203 A 12/1998 LaDue ....................... 455/414
5,850,180 A 12/1998 Hess .......................... 340/541
5,850,344 A 12/1998 Conkright .............. 364/479.01
5,852,408 A 12/1998 Christiansen et al. .. 340/870.09
H1782 H 2/1999 Wicks et al. ........... 340/825.44
5,870,020 A 2/1999 Harrison, Jr. ............... 340/426
5,873,043 A 2/1999 Comer ....................... 455/458
5,874,889 A 2/1999 Higdon et al. .............. 340/426
5,892,442 A 4/1999 Ozery ........................ 340/539
5,894,591 A 4/1999 Tamayo ..................... 455/31.2
5,898,391 A 4/1999 Jefferies et al. ............. 340/988
5,898,904 A 4/1999 Wang ......................... 455/31.3
5,902,234 A 5/1999 Webb ......................... 600/300
5,907,279 A 5/1999 Bruins et al. ............... 340/506
5,917,405 A 6/1999 Joao .......................... 340/426
5,933,080 A 8/1999 Nojima ....................... 340/539
5,933,086 A * 8/1999 Tischendorf et al. ...... 340/5.64
5,936,544 A * 8/1999 Gonzales et al. .......... 340/5.62
5,940,007 A 8/1999 Brinkmeyer et al. ... 340/825.69
5,959,529 A 9/1999 Kail, IV ..................... 340/539
5,983,347 A 11/1999 Brinkmeyer et al. ........ 713/200
6,023,223 A 2/2000 Baxter, Jr. .................. 340/531
6,023,241 A 2/2000 Clapper ................. 342/357.13
6,028,514 A 2/2000 Lemelson et al. .......... 340/539
6,035,021 A 3/2000 Katz ....................... 379/93.12
6,035,217 A 3/2000 Kravitz ....................... 455/561
6,038,896 A 3/2000 Chamberlain et al. ..... 70/279.1
6,044,257 A 3/2000 Boling et al. ............... 455/404
6,057,758 A 5/2000 Dempsey et al. ........... 340/539
6,072,402 A 6/2000 Kniffin et al. ......... 340/825.31
6,078,785 A 6/2000 Bush
6,084,510 A 7/2000 Lemelson et al. .......... 340/539
6,087,952 A 7/2000 Prabhakaran ............ 340/693.5
6,089,058 A 7/2000 Elpern et al. .............. 70/279.1
6,118,866 A 9/2000 Shtivelman ................. 379/309
6,147,622 A 11/2000 Fonea ................... 340/825.31
6,150,942 A 11/2000 O'Brien
6,168,563 B1 1/2001 Brown
6,234,343 B1 5/2001 Papp
6,240,394 B1 5/2001 Uecker et al.
6,243,010 B1 * 6/2001 Addy et al. .................. 340/5.1
6,288,641 B1 9/2001 Casais ........................ 340/539
6,294,999 B1 9/2001 Yarin et al.
6,295,346 B1 9/2001 Markowitz et al. .... 379/127.01
6,305,377 B1 10/2001 Portwood et al.
6,340,928 B1 1/2002 McCurdy .................... 340/436
6,377,810 B1 4/2002 Geiger et al.
6,388,612 B1 5/2002 Neher ................... 342/357.07
6,442,241 B1 8/2002 Tsumpes ...................... 379/45
6,480,147 B2 11/2002 Durst et al.
6,529,723 B1 3/2003 Bentley ...................... 455/405
6,532,979 B1 3/2003 Richter
6,553,236 B1 4/2003 Dunko et al.
6,571,103 B1 5/2003 Novakov
6,591,094 B1 7/2003 Bentley ...................... 455/405
6,668,284 B1 12/2003 Parkhurst
6,687,517 B2 2/2004 Kinnunen
6,720,861 B1 * 4/2004 Rodenbeck et al. ....... 340/5.64
6,759,956 B2 7/2004 Menard et al.
6,847,293 B2 1/2005 Menard et al.
2001/0011224 A1 8/2001 Brown
2001/0025208 A1 9/2001 Bartur
2001/0044731 A1 11/2001 Coffman et al.
2001/0056226 A1 12/2001 Zodnik et al.
2002/0016722 A1 2/2002 Kameda
2002/0017996 A1 2/2002 Niemiec
2002/0178385 A1 * 11/2002 Dent et al. .................. 713/202
2002/0180582 A1 * 12/2002 Nielsen ...................... 340/5.6
2004/0100374 A1 5/2004 Menard et al.
2004/0201475 A1 10/2004 Menard et al.
2004/0203563 A1 10/2004 Menard
2004/0218732 A1 11/2004 Menard et al.
2004/0247086 A1 12/2004 Menard et al.

OTHER PUBLICATIONS

"AlarmNet–M Mobitex System", *AlarmNet,* http://www.ademco.com/AlarmNet/AlrmNetM.htm, (2000), p. 1.

"allNetDevices:—Geoworks, Openware End Patent Fight", *allNetDevices,* http://www.devices.internet.com, (2000), 1 page.

"allNetDevices:—The Device–Centric Home in 2000: Close, But No Cigar", *allNetDevices,* http://www.devices.internet.com, (2000), 3 pages.
"ARM7 Thumb Family", *Arm Powered,* Product Information, (Prior to May 26, 2000), 4 pgs.
"ARM9 Thumb Family", *Arm Ltd.,* Product Information, (Prior to May 26, 2000), 6 pgs.
"Automatic Crash Notification", *ComCare Alliance,* http://www.comcare.org/overview.htm, (2000), 2 pages.
"Blue–Connect", *Acer NeWeb Corporation,* Product Brief, (Prior to May 26, 2000), 1 pg.
"Blue–Share", *Acer NeWeb Corporation,* Product Brief, (Prior to May 26, 2000), 1 pg.
"Bluetooth—Solutions for Personal Area Networking", *TDK Systems, Inc.,* Manufactures Brochure, (Prior to May 26, 2000), 4 pgs.
"Bluetooth Development using SDL, MSC and TTCN", *Teleogic AB,* Product Information, (Prior to May 26, 2000), 13 pgs.
"Bluetooth Product Design—A Natural Progression of Our Existing Business", *RTX,* Manufactures Brochure, (Prior to May 26, 2000), 4 pgs.
"Bluetooth White Paper", *AU–System AB,* (1999), Entire Pamphlet.
"Connect 24 Data Communications", *Connect 24,* http://www.connect24.com, (2001), 1 page.
"CreateLink", *Motorola, Inc.,* (1999), 2 pages.
"CreataLink 2XT", *Motorola Messaging Products*, www.mot.com/MIMS/MSPG/Products/OEM/calxt/, (Mar. 1999), 1 p.
"CreataLink 2XT", *Motorola,* http://www.motorola.com/MIMS/MSPG/Products/OEM/calxt, (Mar. 1999), 1 page.
"Designing Solutions for the Internet Economy", *Intel Developer Forum Spring 2000,* Program Brochure, (Feb. 15–17, 2000), 2 pages.
"Digianswer Bluetooth—Development and Demonstration Tools", *DIGIANSWER A/S,* Product Sheet, (Prior to May 26, 2000), 6 pgs.
"DIGIANSWER/Bluetooth Technology", *Digainswer (Irl)Ltd.,* Product Inforamtion, (Prior to May 26, 2000), 8 pgs.
"Emergency 911 Cellular Phone and Cellular Phone Accessories", *AAA Communications,* http://web.idirect.com/aaa/, (2001), 1–7 pages.
"Emergency Terms", *Glossary,* http://www.comcare.org/glossary.htm, (2000), 3 pages.
"Empowering the mobile enterprise", *Puma Technology, Inc.,* Manufactures Brochure, (1996–1999), 2 pages.
"Emulation System Speeds Development of CDMA Satcom Handsets", *Penton Publishing, inc.,* Product Information, (1997), 4 Pages.
"Enabling Innovation", *Arm Ltd.,* Product Brochure, (1999), 10 Pages.
"Get a better vantage point and outmaneuver the competition", *Cadence Design Systems, Inc.,* Manufacture Brochure, (1999), 6 pgs.
"Introduction to the HomeRF Technical Specification", *HomeRF,* (2000), pp. 1–17.
"IVT—Bluetooth Protocol Stack SDL/C Source Code", *Bluthtooth,* Product Brochure, (Prior to May 26, 2000), 2 pgs.
"Lucent Technologies and Bluetooth", *Lucent Technologies, Inc.,* Manufactures Brochure, (Dec. 1999), 2 pages.
"ObjectGEODE—The Most Advanced Integrated Environment for the Development of Distributed Real–time Systems", *VERILOG S.A.,* (1998), Entire Brochure.
"ORA Electronics Introduces Rescue Mate, a Complete Cellular Telephone Safety Package", *Business Wire,* http://www.findarticles.com, (1998), 2.
"OSE—the new generation realtime operating system", *ENA OSE Systems,* Informational Brochure, (1999), Entire booklet.
"PSAP Updates and Third–Party Call Centers", *ComCARE Alliance,* http://www.comcare.org/psap.htm, (2000), 2 pages.
"Samsung Electronics joins home radio frequency group in development of wireless network for the home", *Samsung Electronics,* http://www.samsung.com/news/samsung/1998/sea0305.html, (1998), 2 pgs.
"Socket's Bluetooth Cordless Communications Card FAQ", *Socket Communications, Inc.,* Informational Literature, (Dec. 1999), 2 pages.
"Spontaneous Connections", *CommVerge,* (May 2000), 6 pages.
"Tachless Remote Engine Starters", *Almex,* http://www.almexltd.com/iei/mantis1200.htm, (2000), pgs. 1–3.
"Technology Solutions for Bluetooth from Ericsson Microelectronics", *Erricson Components AB,* Manufactures Brochure, (Nov. 1999), 2 pages.
"The Ericsson Bluetooth Development Kit—Faster Launching of Bluetooth Products", *Ericsson Mobile Communications, AB,* Manufactures Brochure, (1999), 2 pgs.
"The Secret of Success!", *SIGnal Newsletter—The Official Newsletter of the Bluetooth Special Interest Group,* Issue No. 3, (Nov. 1999), 8 pgs.
"UMTS W–DCMA Technology Development Using the Aptix System Explorer Mp4 for Algorithm Verification", *Aptix Corporation,* Product Information, (1999), 4 Pages.
"Unleash the World—Core technology for Bluetooth applications", *Ericsson Mobile Communications AB,* Manufactures Brochure, (1999), 7 pgs.
"Will the push—not pull—of Internet information dramatically alter our Web Interaction", *SunWorld,* http://www.sunworld.com, (2000), 6 pgs.
"Wireless Connections Made Easy", *Bluetooth,* Manufactures Brochure, (Prior to May 26, 2000), 19 pgs.
"Your Vision—Our Solution", *RTX Telcom,* Manufactures Brochure, (Prior to May 26, 2000), 5 pgs.
Houston, Jerry, "Socket Teams with Cambridge Silicon Radio for Bluetooth Cordless Networking on Windows CE", *Socket Communications, Inc.,* Press Release, (1999), 2 pages.
Nobel, Carmen, "Microsoft jumps on the Bluetooth bandwagon", *PC Week,* (Dec. 6, 1999), 1 page.
Posti, J., "Motorola Introduces CreataLink 2 XT ReFLEX Two–way Data Transceiver for Wireless Communications", *Motorola Press Release,* www.mot.com/MIMS/MSPG/Press/PRI9990303_21575.html, (Mar. 1999), 2 p.
Menard, Raymond J., et al., "Assisted Personal Communication System and Method", U.S. Appl. No. 10/719,672, filed Nov. 21, 2003, 25 pgs.
Menard, Raymond J., et al., "Bi–directional Wireless Detection System", U.S. Appl. No. 10/757,367, filed Jan. 14, 2004, 35 pgs.
Menard, Raymond J., et al., "Bi–Directional Wireless Detection System", U.S. Appl. No. 09/372,249, filed Aug. 11, 1999, 36 pgs.

Menard, Raymond J., et al., “Bi–directional Wireless Detection System”, U.S. Appl. No. 09/956,474, filed Sep. 19, 2001, 38 pgs.

Menard, Raymond J., et al., “Detection System using Personal Communication Device with Response”, U.S. Appl. No. 10/322,374, filed Dec. 17, 2002, 17 pgs.

Menard, Raymond J., “Emergency Communication and Monitoring System and Method”, U.S. Appl. No. 10/165,221, filed Jun. 7, 2002, 29 pgs.

Menard, Raymond J., “Emergency Response Information Distribution”, U.S. Appl. No. 10/409,661, filed Apr. 7, 2003, 35 pgs.

Menard, Raymond J., et al., “Interactive Motion Sensitive Sensor”, U.S. Appl. No. 10/601,330, filed Jun. 20, 2003, 46 pgs.

Menard, Raymond J., et al., “Long Range, Bidirectional, Wireless Personal Communication System”, U.S. Appl. No. 09/277,805, filed Mar. 27, 1999, 25 pgs.

Menard, Raymond J., et al., “Method and System for Wireless Tracking”, U.S. Appl. No. 10/112,669, filed Mar. 28, 2002, 79 pgs.

Menard, Raymond J., et al., “Molecular Communication System and Method”, U.S. Appl. No. 09/579,913, filed May 26, 2000, 68 pgs.

Menard, Raymond J., et al., “Remote Notification of Monitored Condition”, U.S. Appl. No. 10/112,690, filed Mar. 28, 2002, 75 pgs.

Menard, Raymond J., et al., “Systems and Methods for Transmitting Signals to a Central Station”, U.S. Appl. No. 10/640,876, filed Aug. 13, 2003, 18 pgs.

Puchek, Daniel R., et al., “Monitoring and Communication System for Stationary and Mobile Persons”, U.S. Appl. No. 10/254,048, filed Sep. 23, 2002, 41 pgs.

Puchek, Daniel R., et al., “Monitoring and Communication System for Stationary and Mobile Persons”, U.S. Appl. No. 09/315,739, filed May 20, 1999, 38 pgs.

Webb, Nicholas, “Medical Communication System for Ambulatory Home–Care Patients”, U.S. Appl. No. 09/880,817, filed Jun. 27, 1997, 30 pgs.

Menard, R. J., “Detection System Using Personal Communication Device With Response”, U.S. Appl. No. 11/006,507, filed Dec. 7, 2004, 39 Pages.

Menard, R. J., et al., “Interactive Motion Sensitive Sensor”, U.S. Appl. No. 10/290,097, filed Nov. 7, 2002, 49 Pages.

Menard, R. J., et al., “Long Range, Bidirectional, Wireless Personal Communication System”, U.S. Appl. No. 09/277,805, filed Mar. 27, 1999, 25 Pages.

Menard, R. J., et al., “Modular Communication System and Method”, U.S. Appl. No. 09/579,913, filed May 26, 2002, 68 Pages.

* cited by examiner

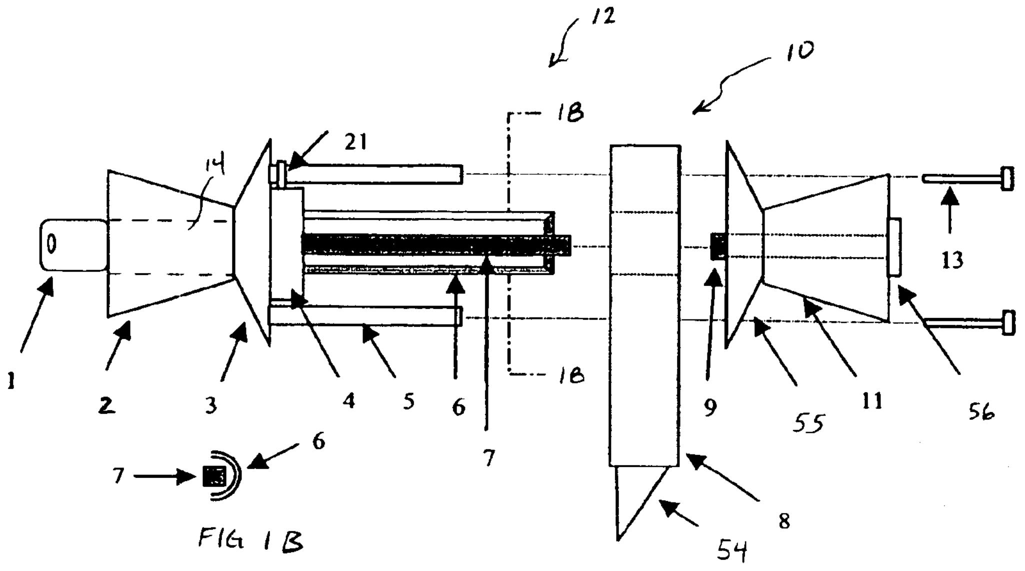
FIG 1B
FIG. 1A
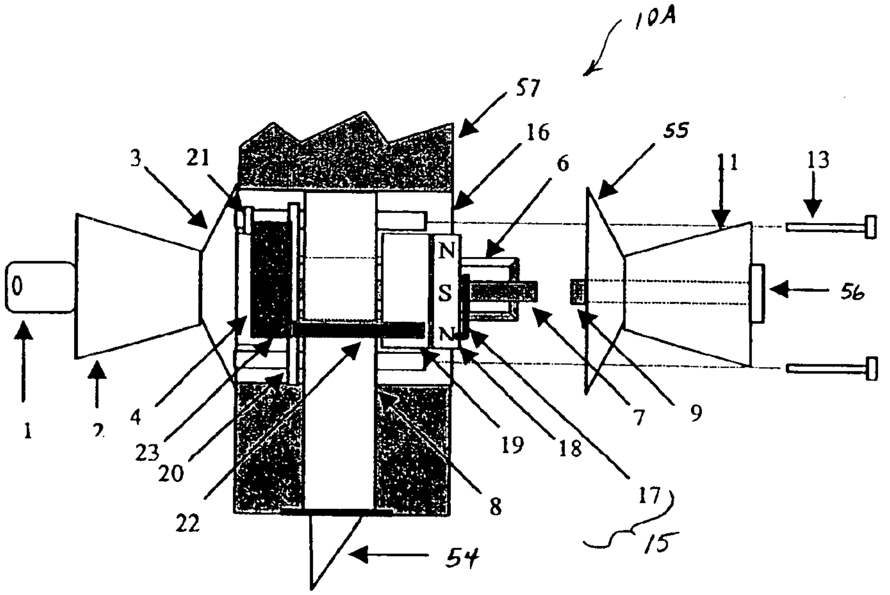
FIG. 2

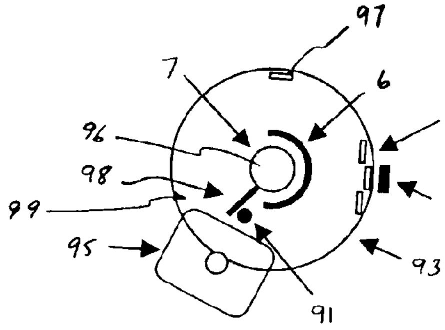
FIG. 9
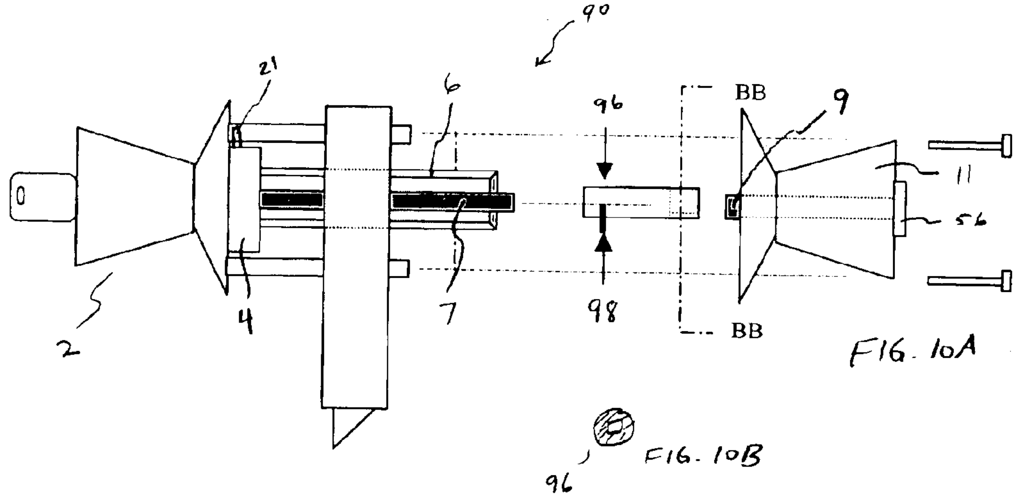
FIG. 10A
FIG. 10B
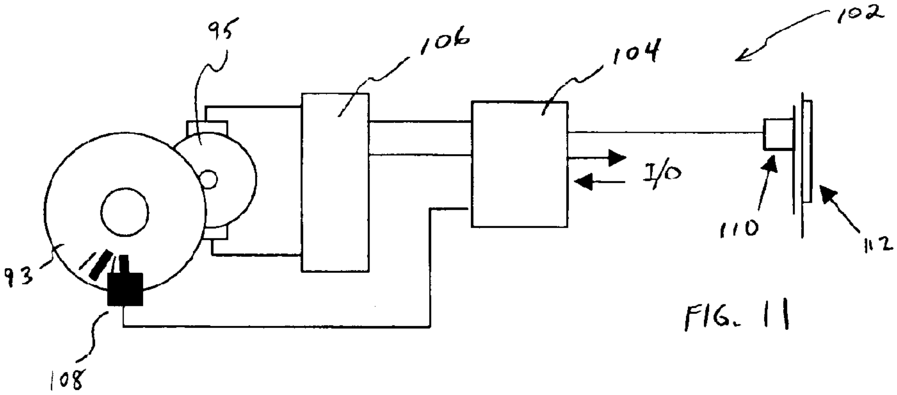
FIG. 11

ELECTRONIC LOCK CONTROL AND SENSOR MODULE FOR A WIRELESS SYSTEM

FIELD OF THE INVENTION

This invention relates to the field of electronic locks, and more specifically to a method and apparatus for sensing and controlling an electronic lock.

BACKGROUND

The electronic control of devices such as door locks can be a great convenience and time save for a user. For instance, the advent of remote controlled and semi-automatic door locks on cars has been a popular success with consumers.

However, for entry doors in a building, the electrical operation of locks is accomplished with mechanisms that extend or retract the latch bolt of the door lock in and out of the strike plate mounted on a doorjamb. One drawback of these devices is that it takes considerable electrical energy to move a latch bolt, particularly if frictional forces are present, such as wind forces on the door and bolt. Another drawback is that they require an expensive lock mechanism usually requiring a complicated installation. Despite these disadvantage, these devices are used in mortise locks in commercial and institutional environments, such as hotels.

Some entry doors include entry security systems. Such security systems sometimes include a sensor mounted on the door which conveys the open or closed status of the door. A central control is used to activate and deactivate the sensor. A provision is usually made to warn the occupant in the event that the door has been left open which must be corrected before activating the system. There is no provision, however to warn the occupant that a door may be unlocked. To determine the locked status, the occupant must visit and check each door. An unlocked door could lead to an intrusion or a costly and upsetting false alarm. Furthermore, present systems inconveniently require that when an occupant arrives at the premise they must use a key to gain entry and then operate an alarm control keypad to de-activate the alarm.

Accordingly, there is a need for a low-cost, easily installable door entry system which provides electronic access and control, and which provides for more full-featured security.

SUMMARY

An electronic lock control for a wireless system has been developed. One aspect of the present system provides an electronically controllable door lock. In one embodiment, a lock system includes a cylindrical door lock having a latching spindle and an opening spindle which are concentrically oriented, and a wireless communication system to transmit signals indicating the relative positions of the latching spindle and the opening spindle. One embodiment includes a door lock assembly having a lock mechanism for placing the lock assembly into an unlocked state or a locked state, an electrically controlled actuator assembly to control the lock mechanism, a transceiver coupled to the actuator assembly, and a communication device to communicate over a two-way wireless network with the electrically controlled actuator. One embodiment includes a retrofit actuator assembly adapted to be mounted on an existing lock to control a locking mechanism of the lock, and a two-way communication device to control the retrofit actuator assembly and to receive signals from the retrofit actuator assembly indicating a state of the locking mechanism.

Another aspect of the present system provides an entry door security system. In one embodiment, the security system includes an electronically controllable door lock mechanism for putting a door into an unlocked state or a locked state, and a central control module for sensing and controlling a state of the door lock mechanism, wherein the central control module communicates with the electronically controllable door lock mechanism via a wireless network.

BRIEF DESCRIPTION OF THE DRAWINGS

FIG. 1A shows an exploded top view of an example of a cylindrical door lock.

FIG. 1B shows a cross-sectional view of a portion of the lock of FIG. 1A.

FIG. 2 is a top view of a cylindrical door lock assembly according to one embodiment of the present system.

FIG. 9 is a front view of a door lock assembly according to one embodiment of the present system.

FIG. 10A is a top view of portions of the cylindrical door lock assembly of FIG. 9.

FIG. 10B shows a cross-sectional view of a portion of the lock assembly sleeve of FIG. 10A.

FIG. 11 is a schematic representation of a door lock circuitry in accordance with one embodiment of the present system.

DETAILED DESCRIPTION

Figure 3A:
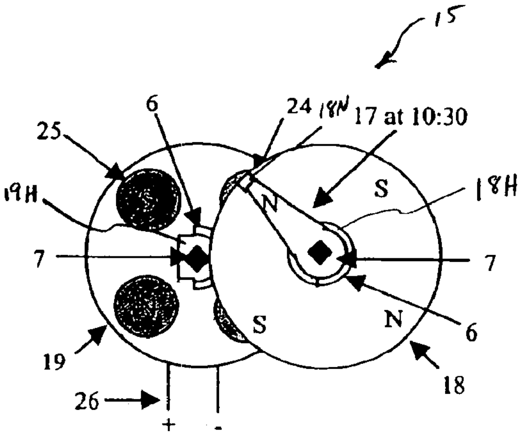
FIG. 3A is an exploded view of an actuating member of the cylindrical door lock assembly of FIG. 2.

In the following detailed description, reference is made to the accompanying drawings that form a part hereof, and in which are shown by way of illustration specific embodiments in which the invention may be practiced. It is understood that other embodiments may be utilized and structural changes may be made without departing from the scope of the present invention.

FIG. 1A shows an exploded top view of an example of a cylindrical door lock 10. FIG. 1B shows a cross-section of a portion of assembly 10. Cylindrical door lock 10 is an example of a standard cylindrical door lock. Such lock are also known as bore locks or tubular door locks. Instances of such standard locks are cylindrical door locks manufactured by Kwikset Corporation. Lock 10 is merely an example of such cylindrical locks and is not meant as an exhaustive or exclusionary example.

Cylindrical door lock 10 includes a lock chassis 12 that is mountable in a borehole in a door such that the chassis does not rotate. Components of a portion of lock chassis 12 generally mounted in the exterior side of the door are an exterior collar 3, a tumbler mechanism 14, and threaded bosses 5, which receive interior mounting bolts or screws 13.

Door lock 10 includes an outer spindle or opening spindle 6 and an inner spindle or latching spindle 7. Typically, latching spindle 7 is located within and coaxially and concentrically oriented relative to opening spindle 6. A rotatable exterior handle such as a doorknob 2 is coupled to opening spindle 6 that is in turn coupled to a locking mechanism 4 and slide coupled to latch bolt assembly 8. When locking mechanism 4 is in the unlocked state, knob 2 can be rotated, causing rotation of both latching spindle 7 and opening spindle 6. Opening spindle 6 then engages latch bolt assembly 8 in such a manner as to cause a latch bolt 54 to be retracted, thus allowing the door to be opened and permitting access.

To place the lock in the locked state from the exterior of a door, an appropriate key 1 is inserted in the keyway or receptacle in exterior knob 2 and rotated, causing corresponding rotation of latching spindle 7 relative to opening spindle 6. Such relative rotation causes, through a cam action, a locking member 21 of locking mechanism 4 to extend or retract thus engaging or disengaging with a fixed member of lock chassis 12. This either allows or prevents rotation of opening spindle 6 and thus operation of bolt assembly 8. To unlock the door, the reverse action is taken.

The portion of cylindrical lock 10 toward the interior of the door consists of a collar 55 that will become a part of lock chassis 12 once assembled with screws 13 to threaded bosses 5.

Cylindrical lock 10 also includes a rotatable inside door handle such as a knob 11 that is designed to engage opening spindle 6 in a sliding manner, and a manually operated locking member 56, such as a twist operated button or a push button. Locking member 56 is attached to a keyed coupling spindle 9 that is, in turn, designed to engage latching spindle 7 in a sliding manner. The sliding engagements provide that the outer and inner portions of lock 10 are slide couplable so as to allow for doors of different thickness.

Rotation of interior doorknob 11 will cause a corresponding rotation of opening spindle 6 and latching spindle 7. Opening spindle 6, in turn, causes latch bolt 54 to be extended or withdrawn from bolt assembly 8 thereby allowing access, providing such rotation is allowed by the position of locking member 21 of locking mechanism 4. In practice, some designs employ a clutch mechanism that allows rotation of the interior knob 11 and corresponding withdrawal of bolt 54 from bolt assembly 8 regardless of the position of locking member 21 in order to provide immediate egress in case of fire.

To lock or unlock the door from the interior, manual locking member 56 is actuated independently of second handle or knob 11. This causes rotation of coupling spindle 9 which, in turn, causes rotation of latching spindle 7 by means of keyed engagement with spindle 9. This action ultimately operates locking mechanism 4 causing engagement or disengagement of locking member 21.

Door locking mechanisms such as locking mechanism 4 can be activated with much less energy than the energy required to move a bolt such as latch bolt 54. Furthermore, the majority of residential entry locks employ a common method, as described above for FIG. 1, of activating said locking mechanism in the form of an axial latching spindle 7. Accordingly, it is more appropriate to remotely read and control the status of the locking mechanism as opposed to operating the latch bolt directly. This saves energy on operational costs since the power can be shut down between cycles and because it takes much less energy to activate the locking mechanism than actuating the bolt directly. Moreover, such an electrically lockable mechanism will not interfere with the normal manual operation of the lock whether by key, doorknob, or manual locking operation.

FIG. 2 is a top view of a cylindrical door lock assembly 10A according to one embodiment of the present system. Door lock assembly 10A is shown mounted on a door 57. Assembly 10A includes many of the same members as assembly 10 and discussion of certain details will be omitted. Door lock assembly 10A includes an electronic assembly consisting of a printed circuit board 20, one or more electronic components 23, and a position sensor 22, the functions of which shall subsequently be described in detail.

Cylindrical door lock assembly 10A also includes an actuating member 15. Actuating member 15 provides the rotational actuation to cause latching spindle 7 to rotate relative to opening spindle 6, thereby causing activation or release of lock mechanism 4. At the same time, actuating member 15 is structured and located so as not to interfere with the normal manual operation of the door lock. In one embodiment, actuating member 15 includes an electronically controllable member 18 which is coupled to latching spindle 7 and rotatable around opening spindle 6. Member 18 rotates latching spindle 7 relative to opening spindle 6 when an appropriate electronic signal is received by actuating member 15 via electronic components 23.

In this example, a convenient point to engage latching spindle 7 is at or near the sliding engagement of latching spindle 7 and coupling spindle 9, as these members are keyed in a manner which permits a sliding engagement while maintaining a rotational coupling. An intervening coupling is used to engage the same keying scheme in order to transmit rotational motion.

In one embodiment, actuating member 15 is positioned on spindles 6 and 7 so that at least a portion of each spindle extends through the actuating member towards the inside of the door. This allow the actuating member to be mounted partially or completely within door 57. This system also allows knob 11 to directly engage opening spindle 6 and latching spindle 7. This allows the door lock to be put into a locked or unlocked position in response to an electrical signal without disrupting the normal manual operation of the lock. Thus, a user can still use member 56 and key 1 to lock and unlock the door. Moreover, in this example, power is only applied to actuating member 15 when it is being actuated. Accordingly there is no resistance to a user using key 1 or manual locking member 56 to manually rotate locking spindle 6.

One advantage of the present system is that it can be retrofit on existing cylindrical door locks. The present system is operable with many existing residential cylindrical locks. The present system provides an intervening means to couple the electronic control apparatus of the system to latching spindle 7 in a manner permitting retrofit to many of the installed residential cylindrical locks, such as lock 10 (FIG. 1A). As described above, in one embodiment actuating member 15 slides onto latching spindle 7 and is located at least partially within a core of a door the cylindrical door lock is mounted to. This provides that the apparatus will fit within the existing lock bore so that the appearance of the existing lock is not altered.

In one embodiment, actuating member 15 includes a first member such as a stator 19, a second member such as a rotor 18, and a third member, such as a control arm or adapter 17, for engaging with the latching spindle. In one embodiment, door lock assembly 10A can include a position sensor 22 which senses a rotational position of second member 18. The position sensor 22 is mounted within a core of the cylindrical door lock. In one embodiment, sensor 22 is a Hall effect type sensor. Advantageously, sensor 22 allows the system to know the position of member 18 which in turn indicates the state of lock mechanism 4. This information can be transferred to a central controller or host system, or other remote device, as will be detailed below, to allow the central controller to control the environment. Optical sensors, proximity sensors, and other motion and location sensors can also be used. Moreover, due to the retrofit design, the present actuator can sense the state of the lock mechanism even if the lock is manually actuated by member 56 or key 1.

Figure 3B:
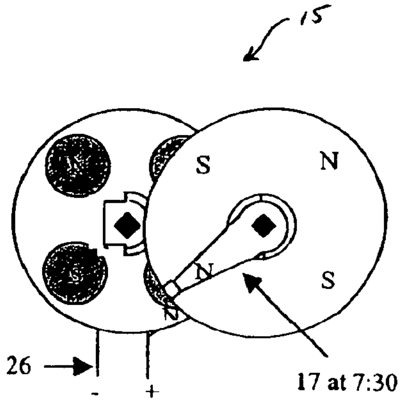
FIG. 3B is another exploded view of the actuating member of FIG. 3A.

FIGS. 3A and 3B show an exploded view of actuating member 15 according to one embodiment. FIGS. 3A and 3B illustrate the operation of actuating member 15 which is capable of causing a 90 degree rotation of latching spindle 7 relative to opening spindle 6 when electrically energized with a pulse of the correct DC polarity. In FIGS. 3A and 3B the components of actuating member 15 are shown offset to each other for the purpose of illustration. As can be seen from FIG. 2, the components of the apparatus are aligned axially when in use.

In this embodiment, actuating member 15 includes stator 19, rotor 18 and adapter 17. Stator 19 is a collar-shaped member which includes a keyed hole 19H dimensioned to couple stator 19 with opening spindle 6. Stator 19 is dimensioned to be slide coupled and rotationally keyed to opening spindle 6 while allowing latching spindle 7 to freely rotate within hole 19H. Rotor 18 is a collar-shaped member which includes a hole 18H which is dimensioned so that rotor 18 can be slide coupled to opening spindle 6 and allowed to freely rotate around the opening spindle. Rotor 18 has a notch 18N which engages with adapter 17. Adapter 17, in turn, engages latching spindle 7, thus coupling rotor 18 rotationally to latching spindle 7. Adapter 17 is rotationally coupled and slide coupled to latching spindle 7 and rotationally coupled to rotor 18.

In one embodiment, stator 19 includes a four pole stator which comprises four pole pieces 25, each of which have series connected coils that are alternately wound in the opposite direction. Rotor 18 includes a four-pole permanent magnet. Thus, application of a DC pulse of a certain polarity to a coil array 26 will produce a pattern of alternate magnetic fields in pole pieces 25. Applying a pulse of the opposite polarity will reverse the field pattern.

As can be seen from comparison of FIG. 3A to FIG. 3B, the application of opposite polarity DC pulses to the stator windings 26 will cause rotor 18 and adapter 17 and therefore latching spindle 7 to alternately rotate approximately 90 degrees relative to opening spindle 7. This rotation changes the status of lock mechanism 4 from locked to unlocked status.

Another feature of the present apparatus is that when stator 19 is non-energized, actuating member 15 may easily be manually overridden by lock operation using key 1 or the interior twist knob 56. Moreover, since power is only applied to the mechanism when it is being changed from one state to another, the mechanism does not need to be supplied constantly with power. This provides low operational costs.

Figure 4:
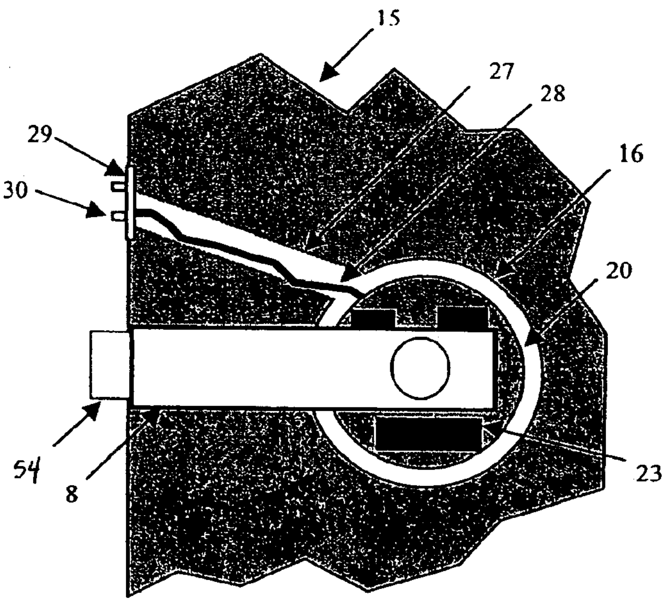
FIG. 4 is a cut-away side view of a cylindrical door lock assembly installed on a door, in accordance with one embodiment of the present system.

FIG. 4 is a cut-away side view of a cylindrical door lock assembly installed on a door 57, in accordance with one embodiment of the present system. Shown in FIG. 4 are printed circuit board 20 and electronic components 23 as may be positioned in a 2⅛" lock bore. Also shown is lock bolt assembly 8 and latch bolt 54 which are fitted into a standard bore from the jamb side of the door. Also shown is a bore 27 that has been made to accommodate two-conductor wiring 28 that connects circuit board 20 to a contact assembly 29 and two spring contacts 30. Spring contacts 30 are for engaging a mating contact plate installed in the door jamb, thus allowing transfer of electrical power and command signals between the door mounted locking apparatus and a remotely mounted control unit. In one embodiment, the electrical power includes AC power.

Figure 5B:
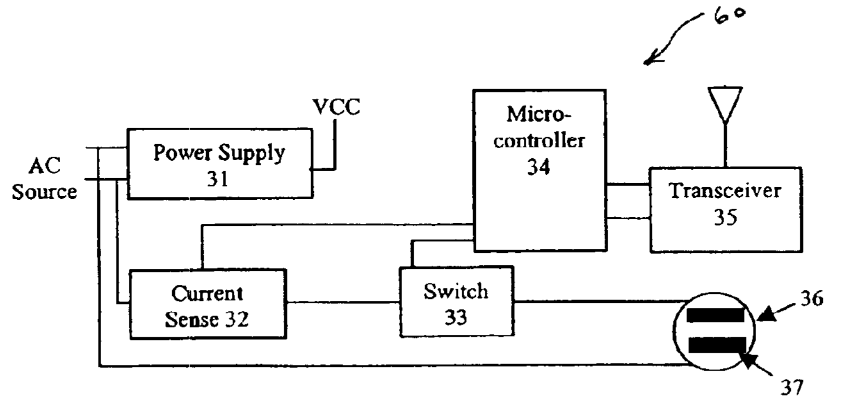
FIG. 5B is a schematic representation of a control unit for a door lock assembly, in accordance with one embodiment of the present system.
Figure 5A:
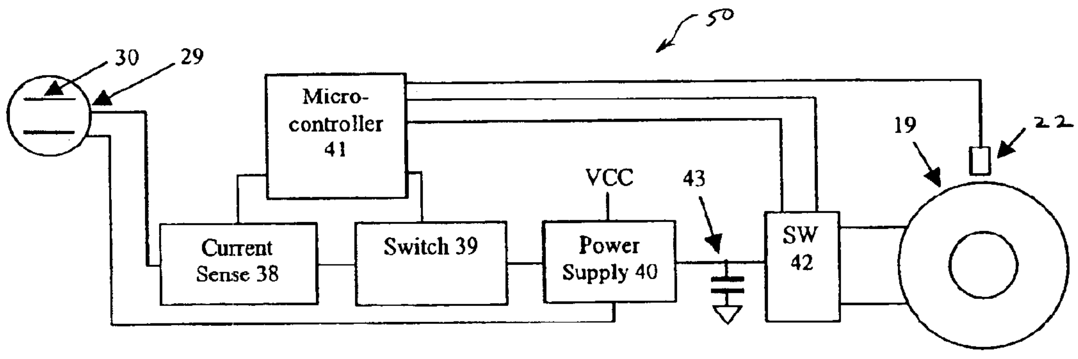
FIG. 5A is a schematic representation of a door lock circuitry in accordance with one embodiment of the present system.

FIG. 5A is a schematic representation of a door lock circuitry unit 50 in accordance with one embodiment of the present system. The example door lock circuitry includes contact assembly 29 and spring contacts 30 that connect the unit to a control module by way of a contact plate and contacts mounted in an engaging position on the door jamb, which will be described below. AC current is passed through a current sense circuit 38 and a switch 39 to a power supply 40 in a manner similar to that described above. A switch 42 is a bipolar switch capable of supplying a current pulse of either polarity to stator 19 thus causing the desired rotation of the lock apparatus. A storage capacitor 43 provides the surge current required to effect rotation without requiring large current carrying capacity on the interconnecting wiring thus permitting use of light gauge wire which can be easily concealed. Position sensor 22 indicates the locked/unlocked status of the mechanism. As discussed above, position sensor 22 is, in one embodiment, a Hall effect type sensor. Position sensor 22 allows the lock assembly to sense and transmit its locked or unlocked state to an associated master control system. Accordingly, a user does not need to check the door to see if it is locked since the user can merely query the central controller.

In one embodiment, lock position information is derived from a timing information based on the 60 Hz frequency of metered electric service. In one embodiment, microcontroller 41 synchronizes to a separate microcontroller (discussed below) by receiving signals produced by current sense circuit 38 at particular portions of the cycle in each 60 Hz frame. Note that a 60 Hz frame with control signals impressed on two consecutive cycles was arbitrarily chosen for the above example. Other frequency values can produce a similar result. Microcontroller 41 also responds to lock/unlock commands at other portions of the cycle in each 60 Hz frame. Further, microcontroller 41 sends the lock/unlock status at yet another portion of the cycles on each frame by causing switch 39 to disconnect the load at the appropriate half cycle time slots as described above. The foregoing timing information may also be used to derive door position information relative to the door frame. The 60 Hz power supply may be provided to the door lock by means of corresponding electrical contacts on the door and the door frame.

Other means of determining lock position or door position are also contemplated. For example, in one embodiment, a battery powered module coupled to a position sensor can also be used.

FIG. 5B is a schematic representation of a control unit 60 for a door lock assembly, in accordance with one embodiment of the present system. Control unit 60 has a conventional DC power supply 31 which supplies power to a microcontroller 34 and other circuits. AC power is routed through a current sense circuit 32 and a switch 33 to the doorjamb mounted contact plate 36 that has contacts 37 adapted to engage spring contacts 30 on the door mounted unit. In one embodiment, the assembly includes a sensor for sensing whether a door to which the cylindrical door lock is coupled to is open or closed by sensing whether contacts 37 engage contacts 30. Communication to and from door unit 50 is accomplished by switching off certain negative or positive portions of the AC cycle. In one example, microcontroller 34 provides synchronization by repeatedly switching off the positive going portions of cycles 1 and 2 of an assumed 60-cycle pattern or frame. In one embodiment, lock and unlock commands are sent by switching negative portions of cycles 21 and 22 off, for unlock, and positive portions off, for lock.

A similar scheme is employed by the door lock unit 50 to send status information to the controller unit 60 by switching off its load that is detected by the controller current sense circuit 32. In one example, cycles 41 and 42 negative off indicates an unlocked condition, positive off indicates a locked condition, and no load indicates an open door.

A transceiver 35 is shown as a method of linking controller unit 60 to a master host system. In one embodiment, transceiver 35 is a wireless transceiver, such as a radio transceiver. Alternatively, other communication means can be employed, including conventional wiring. In one embodiment, transceiver 35 receives signals from the remote host system which are then transferred to actuating member 15 to put the actuating member into an unlocked or locked state. Transceiver 35 can also send signals to the remote host system indicating the state of the actuating member.

In one embodiment, battery back up power (not shown) can be provided utilizing DC to AC conversion. Converting DC to AC may include circuitry as used in an uninterrupted power supply (UPS) unit.

Among other advantages, the system described above provides for reduced power operation and multiplexing of the power and signal wiring in order to simplify connecting the lock circuitry to the jamb side of the door and ultimately a power source and control module.

Figure 6:
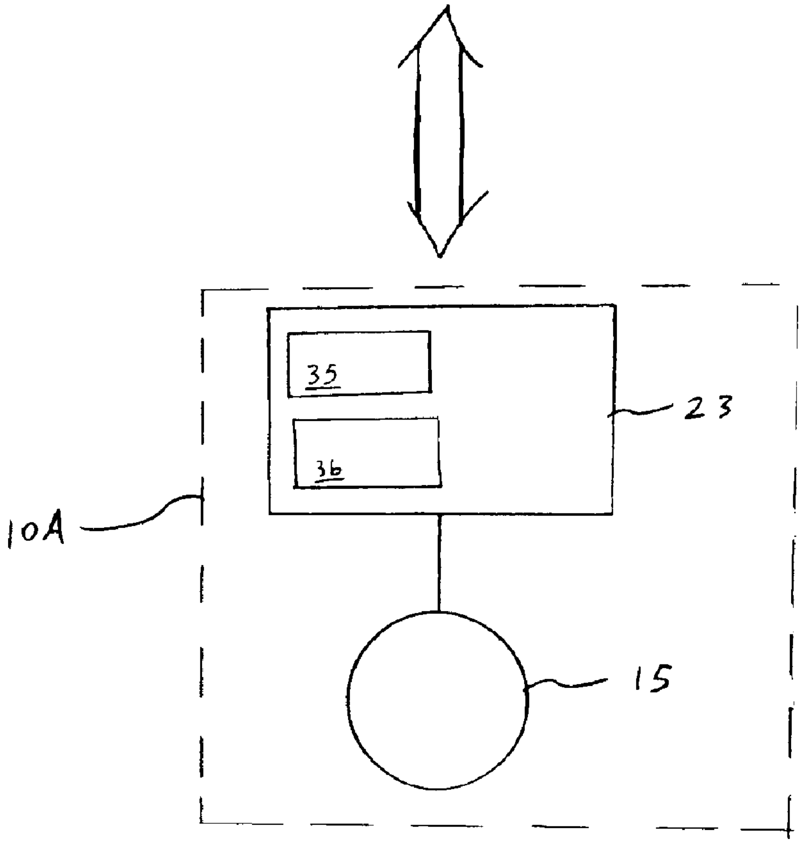
FIG. 6 is a schematic representation of a door lock circuitry in accordance with one embodiment of the present system.

FIG. 6 shows a schematic representation of a door lock circuitry unit in accordance with one embodiment of the present system. In this example, one or more of the details described above for FIGS. 5A and 5B can be omitted and electronics 23 itself includes the necessary functionality to operate, control, and communicate the state of lock assembly 10A. In this example, actuating member 15 is shown electrically coupled to electronics 23 of door lock assembly 10A. The example door lock circuitry can include transceiver 35 to communicate wirelessly with a remote device to allow actuator 15 to be controlled remotely and to allow the actuator to transmit encoded signals indicating the state of the lock.

In one embodiment, transceiver 35 can be BLUETOOTH® enabled. BLUETOOTH® refers to a wireless, digital communication protocol using a miniature transceiver that operates at a frequency of around 2.45 GHz. Typically, BLUETOOTH® transceivers have a range of approximately 10 to 100 meters (and sometimes more) and by combining several BLUETOOTH® transceivers in an ad hoc network, the communication range can be extended indefinitely. The communication range can also be extended by coupling a BLUETOOTH® transceiver with a second transceiver coupled to a long range network, such as a cellular telephone network or pager network. Thus, a system or unit as described herein can be used to link with other systems, units, or devices, such as a cellular telephone, a two way pager, a personal data (or digital) assistant (PDA), or a personal computer via the Internet.

Voice recognition programming executing on a processor or controller 36 of the present system allows hands free operation. Also, the multiple channel capability of BLUETOOTH® allows full duplex conversations between parties and multiple simultaneous independent conversations within a network. Voice recognition programming also allows the user to select a particular unit with which to control or operate.

In one embodiment, transceiver 35 is coupled to a remote processor by a wireless link. Transceiver 35, in one embodiment, is a spread spectrum frequency hopping transceiver. Transceiver 35 may communicate using a protocol compatible with BLUETOOTH®. BLUETOOTH® refers to a wireless, digital communication protocol using a low form factor transceiver that operates using spread spectrum frequency hopping at a frequency of around 2.45 GHz.

BLUETOOTH® is a trademark registered by Telefonaktiebolaget LM Ericsson of Stockholm, Sweden and refers to technology developed by an industry consortium known as the BLUETOOTH® Special Interest Group. BLUETOOTH® operates at a frequency of approximately 2.45 GHz, utilizes a frequency hopping (on a plurality of frequencies) spread spectrum scheme, and as implemented at present, provides a digital data transfer rate of approximately 1 Mb/second. In one embodiment, the present system includes a transceiver in compliance with BLUETOOTH® technical specification version 1.0, herein incorporated by reference. In one embodiment, the present system includes a transceiver in compliance with standards established, or anticipated to be established, by the Institute of Electrical and Electronics Engineers, Inc., (IEEE). The IEEE 802.15 WPAN standard is anticipated to include the technology developed by the BLUETOOTH® Special Interest Group. WPAN refers to Wireless Personal Area Networks. The IEEE 802.15 WPAN standard is expected to define a standard for wireless communications within a personal operating space (POS) which encircles a person. In one embodiment, transceiver 35 is a wireless, bidirectional, transceiver suitable for short range, omnidirectional communication that allows ad hoc networking of multiple transceivers for purposes of extending the effective range of communication. Ad hoc networking refers to the ability of one transceiver to automatically detect and establish a digital communication link with another transceiver. The resulting network, known as a piconet, enables each transceiver to exchange digital data with the other transceiver. According to one embodiment, BLUETOOTH® involves a wireless transceiver transmitting a digital signal and periodically monitoring a radio frequency for an incoming digital message encoded in a network protocol. The transceiver communicates digital data in the network protocol upon receiving an incoming digital message.

According to one definition, and subject to the vagaries of radio design and environmental factors, short range may refer to systems designed primarily for use in and around a premises and thus, the range generally is below a mile. Short range communications may also be construed as point-to-point communications, examples of which include those compatible with protocols such as BLUETOOTH®, HomeRF™, and the IEEE 802.11 WAN standard. Long range, thus, may be construed as networked communications with a range in excess of short range communications. Examples of long range communication may include, Aeris MicroBurst cellular communication system, and various networked pager, cellular telephone or, in some cases, radio frequency communication systems.

In one embodiment, transceiver 35 is compatible with both a long range communication protocol and a short range communication protocol. For example, a person located a long distance away, such as several miles, from lock 10A may communicate with transceiver 35 using a cellular telephone compatible with the long range protocol of transceiver 35. In one embodiment, programming executing on a processor provides information to generate a message to be delivered to a remote cellular telephone. The message may appear on a display of the cellular telephone or it may appear as an audible sound or as an inaudible vibration of the cellular telephone. The message may indicate the position of the door lock, the position of the door, or the operational status of lock 10A.

Feedback may be transmitted to a remote device based on the operation of lock 10A. For example, if a user issues a command to operate lock 10A using a cellular telephone, then the display of the phone will indicate the changes arising from the command. For example a visual indication on a cellular telephone may indicate "locked" or "unlocked." In one embodiment, the cellular telephone, or other device, displays real time information from lock 10A. Further details of a two-way communication control system will be described below in FIG. 12.

Figure 7:
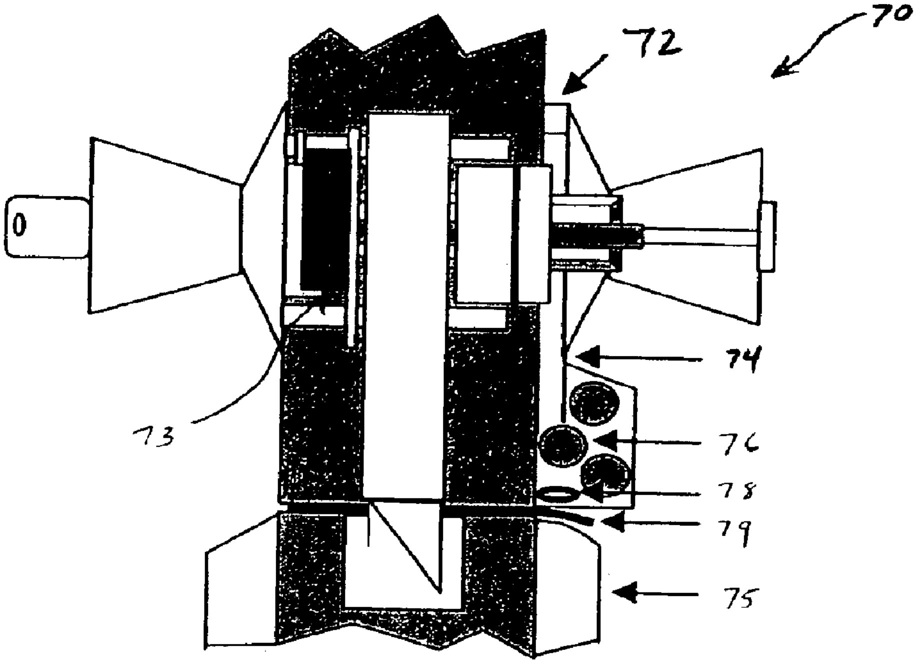
FIG. 7 is a cut-away top view of a cylindrical door lock assembly according to one embodiment of the present system.
Figure 8:
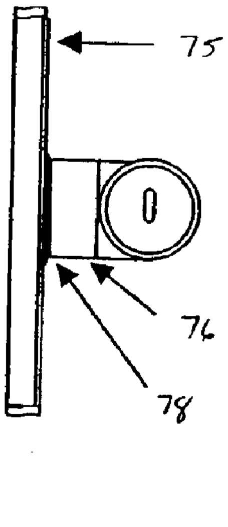
FIG. 8 is a front view of the cylindrical door lock assembly of FIG. 7.

FIGS. 7 and 8 show a cylindrical door lock assembly 70 according to one embodiment of the present system. FIG. 7 is a cut-away top view of cylindrical door lock assembly 70 and FIG. 8 is a front view of the cylindrical door lock assembly.

In this embodiment, the system provides a self-contained, battery powered door lock assembly. Door lock assembly 70 includes a battery housing 72 which is mounted on the interior side of the door by means of the bolts or screws 15 which fasten the interior and exterior portions of the lock assembly. Battery housing 72 includes a telescoping joint 74 which allows the body of the housing to extend to the edge of the door towards doorjamb 75. The telescoping joint allows the length of the housing to be adjustable to accommodate various lock setback distances. In addition to batteries 76, a proximity sensing coil 78 is provided to sense a strike plate 79 in order to determine the open/close status of the door.

Electronics 73 includes one or more of the electronics of FIGS. 5A, 5B and 6, including a transceiver. Accordingly, lock assembly 70 provides a stand-alone, easily installable system.

FIG. 9 is a front view of a lock assembly 90 having a lock actuating member 99 according to one embodiment of the present system. Actuating member 99 locks and unlocks the lock mechanism of a cylindrical lock while permitting manual operation of lock/unlock and door latch functions.

Actuating member 99 is shown mounted on a cylindrical door lock as described above for FIG. 1. The door lock has an outer cut-away spindle or opening spindle 6 which is attached to the exterior door knob, passes through and engages the latch bolt assembly and engages the interior door knob in a sliding manner.

Inner spindle or latching spindle 7 is provided to transmit rotation of the thumb button lock member 56 on interior knob 11 to the lock tumblers such that a 90 degree rotation will cause the lock mechanism to lock or unlock just as if it were key operated. Inner spindle 7 is coupled to interior thumb button lock member 56 by a keyed shaft, which slides to accommodate varying door thickness.

Actuating member 99 includes a sleeve 96 which is positioned around latching spindle 7 and between the inner and outer spindles. Sleeve 96 is keyed to latching spindle 7 so that it rotates with the latching spindle. The purpose of the sleeve is to transmit rotation to the spindle from an attached control arm 98 that, in turn, is engaged by a pin 91 on a spur gear 93 driven by a motor 95. Spur gear 93 is free to rotate around opening spindle 6.

Lock assembly 90 is shown in the locked state where control arm 98 is considered to be in the 0 degree or "home" position. If a user unlocks the unit using a key or the thumb button, a clockwise rotation (when viewed as shown in FIG. 9) of 90 degrees of latching spindle 7 and control arm 98 will occur. Further, if the user elects to unlatch the bolt in order to open the door, a further rotation of + or −45 degrees of both the outer and inner spindles will result. Neither of these operations will interfere with the drive pin 91 which remains at the 0 degree or "home" position.

When an associated controller (as will be described below) receives an unlock command, the controller will cause motor 95 to drive gear 93 in the clockwise direction until an optical sensor 101 or other sensing device determines that the unlock position has been reached (approximately 90 degrees). In one embodiment, an array of targets, such as reflectors 97 can be employed on the gear at approximately 90 degree intervals in order to confirm the position of the gear. Once the unlocked position has been reached, the microcontroller will cause gear 93 to return drive pin 91 to its home or 0 degree position, thus assuring that it will not interfere with user operations.

When a lock command is received, the controller causes gear 93 to rotate counterclockwise approximately 360 degrees, engaging control arm 98 at 270 degrees counterclockwise. Once this operation is completed, the controller causes gear 93 to rotate approximately 360 degrees clockwise back to the "home" or 0 degree position.

In one embodiment, the chassis on which the motor and gear are mounted is fixed to the lock chassis. In one embodiment, the motor and gear chassis is coupled to outer spindle 6. In such an embodiment, the entire motor/gear assembly rotates with the outer spindle when the door knob is operated. One advantage of this method is that only a + or −90 degree rotation is required to lock or unlock the lock set.

FIGS. 10A and 10B show further details of sleeve 96 that is installed on latching spindle 7. FIG. 10A is a top view of portions of the cylindrical door lock assembly 90 of FIG. 9, while FIG. 10B shows a cross-sectional view of a portion of sleeve 96. Sleeve 96 fits between opening spindle 6 and latching spindle 7 and engages latching spindle 6 and the thumb lock coupling spindle 9 by means of an attached insert that matches the cross section of coupling spindle 9. This structure allows at least a portion of outer spindle 6 to directly engage knob 11 so that the door can be operated in a manual manner without interference.

Moreover, the door lock can be put into a locked or unlocked position in response to an electrical signal without disrupting the normal manual operation of the lock. Power is only applied to actuating member 99 when it is being actuated. Accordingly there is no resistance to a user using a key or manual locking member 56 to manually rotate locking spindle 6. Also, the structure of the present sleeve 96 with arm 98 allows the actuating member 99 to be mounted partially or completely within a door. Again, the present actuator assembly is easily retrofit on many existing cylindrical door locks, such as lock 10 (FIG. 1A).

FIG. 11 is a schematic representation of a door lock circuitry 102 in accordance with one embodiment of the present system. Control electronics 104 are coupled to a bi-polar driver 106 which can drive the permanent magnet motor 95 (FIG. 9) in either direction. In one embodiment, an optical photo detector 108 reads patterns or reflectors on the gear in order to determine its position. In one embodiment, detector 108 senses the position of control arm 98 to determine its position. This allows the lock assembly to sense and transmit its locked or unlocked state to an associated master control system. Accordingly, a user does not need to check the door to see if it is locked since the user can merely query the central controller.

A door sensor input which includes a reflective photo transmitter/detector 110 that senses the strike plate 112 of the door lock assembly is also read by control electronics 104. Commands are received by control electronics 104 and data is sent to a higher level processor using I/O means. This allows the master system to detect whether a door is open or closed. Other examples of use of the system is described above for FIGS. 5A, 5B, and 6, which is incorporated herein.

As described above, when control electronics 104 receive an unlock command, the control electronics will cause motor 95 to drive gear 93 in the clockwise direction until a sensing device determines that the unlock position has been reached. Once the unlocked position has been reached, control electronics 104 will cause gear 93 to return the drive pin to its home or 0 degree position, thus assuring that it will not interfere with user operations. When a lock command is received, controller 104 causes gear 93 to rotate counter clockwise approximately 360 degrees, engaging the control arm at 270 degrees counterclockwise. Once this operation is completed, the controller causes gear 93 to rotate approximately 360 degrees clockwise back to the "home" or 0 degree position.

Figure 12A:
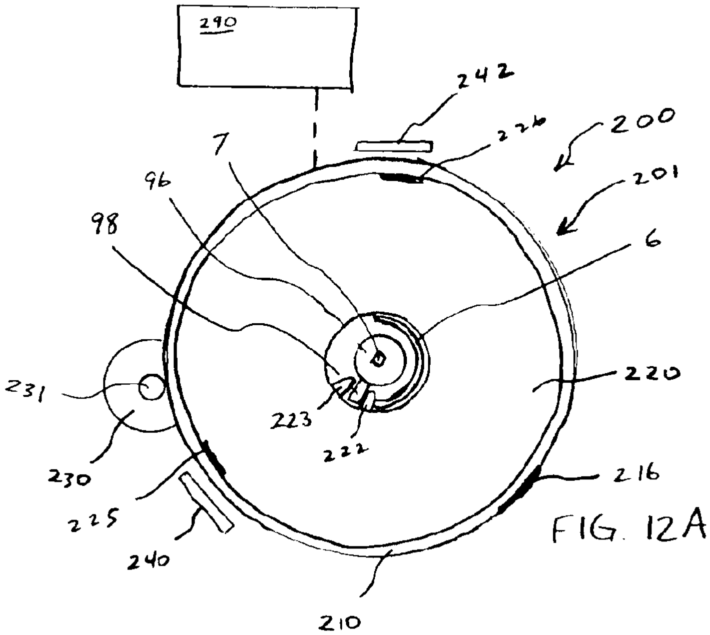
FIG. 12A is a top view of a door lock actuator according to one embodiment of the present system.
Figure 12B:
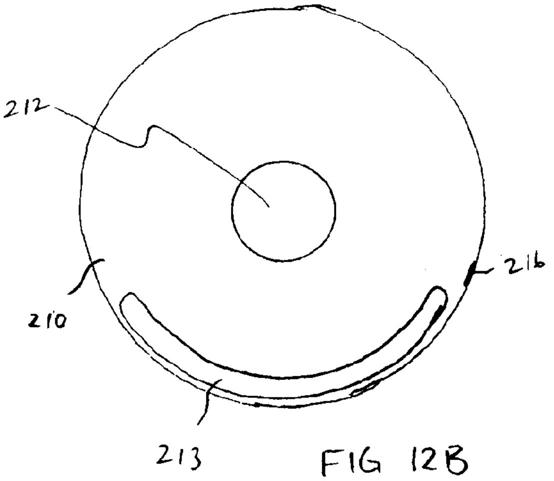
FIG. 12B is a top view of a portion of the door lock actuator of FIG. 12A.
Figure 12C:
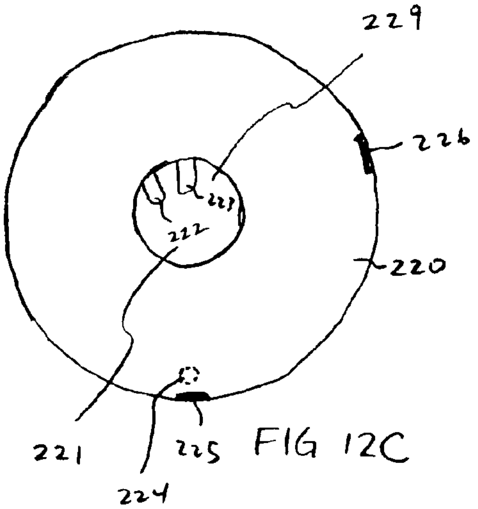
FIG. 12C is a top view of a portion of the door lock actuator of FIG. 12A.

FIGS. 12A–12C show a door lock assembly 200 having an electrically controllable actuator assembly 201 according to one embodiment of the present system. FIG. 12A shows a front view of the assembled actuator assembly while FIGS. 12B and 12C show portions of the device. In one example, actuator assembly is retrofittable upon a standard cylindrical lock as shown in FIG. 1A. Again, this provides as easily installable system for a home owner to install a wirelessly controllable lock system.

In one embodiment, actuator assembly 201 works by the same general principles as actuator assembly 99 described above, and the above discussion is incorporated herein by reference. Actuator assembly 201 includes a sleeve 96 having an arm 98 which is slide coupled and engages latching spindle 7 while rotating freely within opening spindle 6 (See FIG. 10A).

In this embodiment, a motor 230 drives a gear 231. When activated, gear 231 drives a second gear 210 having a 50:1 ration with gear 231. As best seen in FIG. 12B, gear 210 includes a slot or groove 213. Gear 210 also includes a central hole 212 dimensioned to allow gear 210 to freely rotate around opening spindle 6. A ring member 220 is located adjacent gear 210. A post 224 extends from the bottom surface of ring 220 and engages within slot 213. As gear 210 is rotated, ring 220 does not rotate until post 224 engages with either end of the slot.

Ring 220 includes a central hole 229 dimensioned to allow ring 220 to rotate freely around opening spindle 6. Within hole 229 are one or more arms 222 and 223. When ring 220 is driven by gear 210, these arms 222 and 223 engage arm 98 to rotate spindle 7 and lock and unlock the door lock mechanism. When gear 210 is driving ring 220, post 224 will be at one end or the other of groove 213. Thus if a user manually rotates spindle 7 using a key or an internal thumb knob, the user will rotate ring such that post 224 will move to the other end of the slot. This free area of slot 213 allows a user to manually lock the door without having to overcome the 50:1 gear ratio.

In one embodiment, marks or reflective surfaces 226 and 225 are provided oil the outer surface of ring 220, and a similar surface 216 is provided on gear 210. Photoelectric sensors 240 and 242 or other sensing members as described above can be used to detect the position of ring 220 and gear 210 by sensing these marks 225, 226 and 216. This information can be used to determine the rotational position of the members and thus the unlocked or locked state of the lock. This allows the state of the lock to be sensed even if it was manually actuated since a user also rotates ring 220 when actuating the lock. Thus the sensors can pick up the state of the lock when it is electronically actuated or manually actuated.

To retrofit assembly 200 on an existing cylindrical lock, sleeve 96 is slid over latching spindle 7 and gear 210 and ring 220 are slid over opening spindle 6. Control electronics 290 and sensors 242 and 240 can be coupled to the lock assembly. Control electronics 290 are similar to the electronics discussed above for FIG. 5A and FIG. 6 and the above discussions are incorporated herein by reference.

In FIG. 12A, lock assembly 200 is shown in the locked state where control arm 98 is considered to be in the 0 degree or "home" position. If a user unlocks the unit using a key or the thumb button, a clockwise rotation (when viewed as shown in FIG. 12A) of 90 degrees of latching spindle 7 and control arm 98 will occur. Further, if the user elects to unlatch the bolt in order to open the door, a further rotation of + or −45 degrees of both the outer and inner spindles will result.

When associated electronics 290 receives an unlock command, the electronics will cause motor 230 to drive gear 210 in the clockwise direction until the unlock position has been reached. When a lock command is received, the controller causes gear 210 to rotate counterclockwise, engaging ring 220 and thus control arm 98.

In one example use, ring 220 can be driven such that arms 223 or 222 push against the edges of opening spindle 6 and thus rotate both the opening spindle and the latching spindle 7 simultaneously. This allows the actuator to electrically unlock the lock mechanism of the door and unlatch the latch bolt of the door, allowing a user to open the door with a little bit of pressure.

Example of Use

Figure 13:
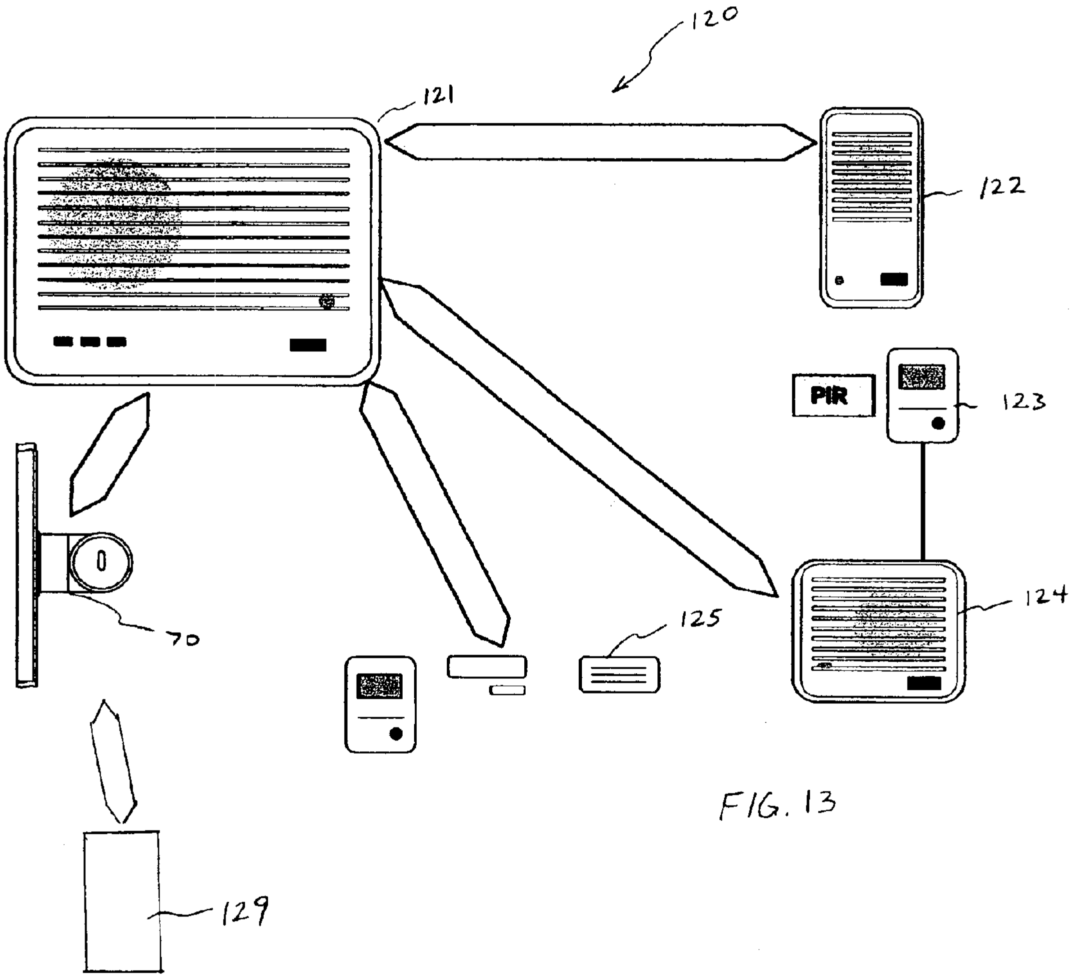
FIG. 13 is an overview of a cylindrical door lock assembly incorporated into an entry system in accordance with one embodiment of the present system.

FIG. 13 is an overview of an entry access and security system 120 which incorporates cylindrical door lock assembly 70 in accordance with one embodiment of the present system. Door lock assembly 70 is shown as an example. Any of the door lock assemblies described above, such as assembly 10A, or assembly 90, or assembly 200 can be utilized within system 120.

Entry system 120 can include one or more of a central control module 121, a door entry module 122, a passive infrared sensor 123, an interior module 124, one or more wireless sensors 125, and a personal communications device 129. In one embodiment, the central control module 121 is linked to each of the other modules via a wireless link. The wireless link may include a radio link. Furthermore, the system allows the occupant or authorized user to selectively lock and unlock doors to permit access to service personnel, for example, according to a timetable, by locally generated commands or remotely generated commands over such media as a public switched telephone network (PSTN), a cellular network, local wireless networks (such as BLUETOOTH®) or the Internet. In one embodiment, a BLUETOOTH® link is provided for communications. This radio link provides a two-way exchange of commands and data as well as providing full duplex voice link.

In one example use, a person who desires to enter a door may push a button on door entry module 122. A signal is then transmitted to central control module 121. Control module 121 can then transmit the information to an owner's cell phone. The user can then tell the central control module 121 to allow the door to be opened. The central control module 121 then transmits an "open" command to door module 70. The door module unlocks the door as described above. The control module receives signals that the door has been unlocked. If the person enters, the control module receives signals that the door has been opened and closed. The control module can also disarm an alarm that has been set up before the person enters.

In one example, the central control module can include a voice sensor. A user speaks into the door entry module or a cell phone. The signal is transferred from the door entry module or the cell phone via a wireless network to the central control module, which then unlocks the door if the voice is authorized.

In one example use, a user installs a cylindrical door lock assembly on all the doors of their house. When going to bed at night or when leaving, the user can activate the locks from a single remote which communicates with the central control module which in turn sends a message to each of the door locks. The open/close sensors on the lock assemblies 70 allow a user to know if any of the doors are open and thus they can be assured the doors are both closed and locked. This allows a simple method for locking all the doors of a home or other building.

Other features are also possible using the present system. For instance, one embodiment includes sending a message to central control module 121 to turn off an alarm when the latching spindle of assembly 70 is rotated. Since the system detects a change from the locked status of a cylindrical lock to the unlocked status, the central control module can de-activate the system when an authorized keyholder unlocks a door thus eliminating the need for a redundant keypad operation. Moreover, although the present system primarily relates to extending the utility of modern residential security systems, one or more features described herein may be employed in any remote control system.

In one example, a Personal Communications Devices (PCD) 129 for communicating with assembly 70 or with modules 121 is used. PCD 129 may be of several different designs. PCD 129 can be a personal, portable communications device. For example, in one embodiment it can be a "response messaging" capable two-way pager. This is service where a two-way pager receives a message and optional multiple-choice responses. The user can select the appropriate responses. Such a design may be adapted to provide basic options related to the system.

In another embodiment, the PCD can be a programmable two-way paging device such as the Motorola PageWriter™ 2000. This is a class of device that acts as both a two-way pager and a handheld computer also known as a PDA (Personal Digital Assistant).

In another embodiment, the PCD can be a cellular telephone. The cell phone may be analog or digital in any of the various technologies employed by the cell phone industry such as PCS, or CDMA, or TDMA, or others. The cell phone may have programmable capability and graphical or text displays.

In embodiments where the user employs standard or adapted paging or cell phones as their PCD, security passwords may be entered by using numeric or other keys on a phone. In another embodiment, the security password may be entered by speaking words. In this embodiment, the system may use word recognition, voice recognition or a combination of these technologies. In the embodiment of a pager, a distinct order of pressing certain keys could provide the equivalent of a security code. For example, 3 short and 1 long on a certain key; or once on key 'a', once on key 'b', and once more on key 'a'.

In another embodiment, the PCD is a handheld computer known as a Personal Digital Assistant (PDA). Many PDAs offer programmable capability and connectivity to various types of long-range wireless networks. Another example of this type of device is the PalmPilot™ or Palm series of devices manufactured by 3-COM™. In these embodiments where a programmable the network module is used such as a PalmPilot, PageWriter or programmable cell phone, the programmable nature of the devices facilitates the implementation of industry-standard designs and would allow for the development of a program written for the devices. In another embodiment, a special manufactured device may be manufactured to serve the needs of the system design requirements for a PCD.

In another embodiment, a PCD such as described herein is connected to a separate module. Serial ports, USB ports or other wired ports, may connect the module to the PCD. Likewise Infrared or other short-range wireless networks may connect the module to the PCD. The module delivers the hardware and software missing in the PCD and the PCD serves as a long-range, bidirectional, wireless modem.

In one embodiment, PCD 129 may be coupled to a portable communication device such as a pager, a cellular telephone, a personal digital assistant or other communication device. In one embodiment, PCD 129 may be line powered. PCD 129 includes a receiver coupled to a microprocessor. PCD 129 may includes a display, speaker, or vibratory mechanism to indicate that a particular predetermined range has been exceeded.

In one embodiment, PCD 129 is equipped with a bi-directional long-distance network for long-range communications such as is delivered in a cellular network. The PCD can incorporate a communications module to connect to a long-range, bi-directional network. Such a system incorporates an existing wireless communications network, such as a cellular network, satellite network, paging network, narrowband PCS, narrowband trunk radio, or other wireless communication network. Combinations of such networks and other embodiments may be substituted without departing from the present system.

In one embodiment, the long-range wireless network is a cellular communications network. In one embodiment, the long-range wireless network is a paging network. In one embodiment the long-range wireless network is a satellite network. In one embodiment the long-range wireless network is a wideband or narrowband PCS network. In one embodiment the long-range wireless network is a wideband or narrowband trunk radio module. Other networks are possible without departing from the present system. In one embodiment, the network module supports multiple network systems, such as a cellular module and a two-way paging module, for example. In such embodiments, the system may prefer one form of network communications over another and may switch depending on a variety of factors such as available service, signal strength, or types of communications being supported. For example, the cellular network may be used as a default and the paging network may take over once cellular service is either weak or otherwise unavailable. Other permutations are possible without departing from the present system.

The long-range wireless network employed may be any consumer or proprietary network designed to serve users in range of the detection system, including, but not limited to, a cellular network such as analog or digital cellular systems employing such protocols and designs as CDPD, CDMA, GSM, PDC, PHS, TDMA, FLEX™, ReFLEX™, iDEN™, TETRA™, DECT, DataTAC™, and Mobitex™, RAMNET™ or Ardis™ or other protocols such as trunk radio, Microburst™, Cellemetry™, satellite, or other analogue or digital wireless networks or the control channels or portions of various networks. The networks may be proprietary or public, special purpose or broadly capable. However, these are long-range networks and the meaning imposed herein is not to describe a premises or facility based type of wireless network.

The long-range wireless network may employ various messaging protocols. In one embodiment Wireless Application Protocol (WAP) is employed as a messaging protocol over the network. WAP is a protocol created by an international body representing numerous wireless and computing industry companies. WAP is designed to work with most wireless networks such as CDPD, CDMA, GSM, PDC, PHS, TDMA, FLEX, ReFLEX, iDEN, TETRA, DECT, DataTAC, and Mobitex and also to work with some Internet protocols such as HTTP and IP. Other messaging protocols such as iMode™, WML, SMS and other conventional and unconventional protocols may be employed without departing from the design of the present embodiment.

As an example, these long-range communication protocols described above may include, but are not limited to, cellular telephone protocols, one-way or two-way pager protocols, and PCS protocols. Typically, PCS systems operate in the 1900 MHZ frequency range. One example, known as Code-Division Multiple Access (CDMA, Qualcomm Inc.) uses spread spectrum techniques. CDMA uses the full available spectrum and individual messages are encoded with a pseudo-random digital sequence. Another example, Global Systems for Mobile communications (GSM), is one of the leading digital cellular systems and allows eight simultaneous calls on the same radio frequency. Another example, Time Division Multiple Access (TDMA, one variant known as IS-136) uses time-division multiplexing (TDM) in which a radio frequency is time divided and slots are allocated to multiple calls. TDMA is used by the GSM digital cellular system. Another example, 3G, promulgated by the ITU (International Telecommunication Union, Geneva, Switzerland) represents a third generation of mobile communications technology with analog and digital PCS representing first and second generations. 3G is operative over wireless air interfaces such as GSM, TDMA, and CDMA. The EDGE (Enhanced Data rates for Global Evolution) air interface has been developed to meet the bandwidth needs of 3G. Another example, Aloha, enables satellite and terrestrial radio transmissions. Another example, Short Message Service (SMS), allows communications of short messages with a cellular telephone, fax machine and an IP address. Messages are limited to a length of 160 alpha-numeric characters. Another example, General Packet Radio Service (GPRS) is another standard used for wireless communications and operates at transmission speeds far greater than GSM. GPRS can be used for communicating either small bursts of data, such as e-mail and Web browsing, or large volumes of data.

In one embodiment, a long-range communication protocol is based on one-way or two-way pager technology. Examples of one way pager protocols include Post Office Code Standardization Advisory Group (POCSAG), Swedish Format (MBS), the Radio Data System (RDS, Swedish Telecommunications Administration) format and the European Radio Message System (ERMES, European Telecommunications Standards Institute) format, Golay Format (Motorola), NEC?D3 Format (NEC America), Mark IV/V/VI Formats (Multitone Electronics), Hexadecimal Sequential Code (HSC), FLEXTM (Motorola) format, Advanced Paging Operations Code (APOC, Philips Paging) and others. Examples of two-way pager protocols include ReFLEXTM (Motorola) format, InFLEXion® (Motorola) format, NexNet® (Nexus Telecommunications Ltd. of Israel) format and others. Other long-range communication protocols are also contemplated and the foregoing examples are not to be construed as limitations but merely as examples.

In one embodiment, PCD 129 is fitted with an additional wireless network. The additional wireless network is a short-range, bi-directional, wireless network. In one embodiment, the short-range wireless network utilizes is a spread spectrum frequency hopping transceiver. This transceiver may communicate using a protocol compatible with BLUETOOTH®, as described above.

Referring again to FIG. 6 and the two-way wireless communications system described there, FIG. 12 illustrates communication links operative with one embodiment of lock assembly 10A, lock assembly 70, lock assembly 90, or lock assembly 200. In the event that transceiver 35 includes a transceiver compatible with BLUETOOTH® protocol, for example, then present system may have sufficient range to conduct bidirectional communications over relatively short range distances, such as approximately 10 to 1,000 meters or more. In some applications, this distance allows communications throughout a premises. In the figure, assembly 70 is shown communicatively coupled to central control module 121. Central control module 121 may be located within communication range of assembly 70 (for example, within approximately 10 meters) and may include an intercom unit, a headset, a computer, a pager, a cellular telephone, a personal data (or digital) assistant (PDA), or other device having a transceiver compatible with BLUETOOTH®.

In one embodiment, assembly 70 communicates with central control module 121, which may include a first transceiver compatible with BLUETOOTH®. Module 121 may provide a repeater service to receive a message using BLUETOOTH® and to retransmit the message using a different communication protocol or also using BLUETOOTH® communication protocol. Module 121 may also include a second transceiver or a wired interface having access to another communication network. The second transceiver or wired interface may retransmit the signal received from assembly 70 or received from some other device. In this way, central control module 121 may serve to extend the communication range of assembly 70. For example, a message between assembly 70 and a device coupled to a communication network may be exchanged using central control module 121. Communications between assembly 70 and a remote device coupled to a communication network may be considered long range communications. Module 121 may also communicate bidirectionally with compatible devices 122, 123, 124, 125, or 129. Compatible devices 122, 123, 124, 125, or 129 may include a second assembly 70.

The communication network may be a PSTN, a pager communication network, a cellular communication network, a radio communication network, the Internet, or some other communication network. It will be further appreciated that with a suitable repeater, gateway, switch, router, bridge or network interface, the effective range of communication of transceiver 35 may be extended to any distance. For example, module 121 may receive transmissions on a BLUETOOTH® communication protocol and provide an interface to connect with a network such as the PSTN. In this case, a wired telephone at a remote location can be used to communicate with assembly 70. As another example, the range may be extended by coupling a BLUETOOTH® transceiver with a cellular telephone network, a narrow band personal communication systems ("PCS") network, a CELLEMETRY® network, a narrow band trunk radio network or other type of wired or wireless communication network.

Various methods may be used to communicate with, or send a message or instruction to, assembly 70 from a remote location. For example, using a cellular telephone, a user may speak a particular phrase, word or phoneme that is recognized by the cellular telephone which then generates and transmits a coded message to assembly 70. As another example, the user may manipulate a keypad on the telephone to encode and transmit a message, instruction or command to assembly 70.

Examples of devices compatible with such long range protocols include, but are not limited to, a telephone coupled to the PSTN, a cellular telephone, a pager (either one way or two way), a personal communication device (such as a personal data or digital assistant, PDA), a computer, or other wired or wireless communication device.

Short range communication protocols, compatible with transceiver 35 may include, but are not limited to, wireless protocols such as HomeRF™, BLUETOOTH®, wireless LAN (WLAN), or other personal wireless networking technology. HomeRF™, currently defined by specification 2.1, provides support for broadband wireless digital communications at a frequency of approximately 2.45 GHz.

In one embodiment, transceiver 35 is compatible with a communication protocol using a control channel. One such example is CELLEMETRY®. CELLEMETRY® is a registered trademark of Cellemetry LLC of Atlanta, Ga., USA, and enables digital communications over a cellular telephone control channel. Other examples of communication technology are also contemplated, including MicroBurst™ technology (Aeris.net, Inc.).

Other long range and short range communication protocols are also contemplated and the foregoing examples are not to be construed as limitations but merely as examples.

Transceiver 35 may be compatible with more than one communication protocols. For example, transceiver 35 may be compatible with three protocols, such as a cellular telephone communication protocol, a two-way pager communication protocol, and BLUETOOTH® protocol. In such a case, a particular assembly 70 may be operable using a cellular telephone, a two-way pager, or a device compatible with BLUETOOTH®.

In one embodiment, assembly 70 can communicate with a remote device using more than one communication protocols. For example, assembly 70 may include programming to determine which protocol to use for communicating.

The determination of which communication protocol to use to communicate with a remote device may be based on power requirements of each transceiver, based on the range to the remote device, based on a schedule, based on the most recent communication from the remote device, or based on any other measurable parameter. In one embodiment, assembly 70 communicates simultaneously using multiple protocols.

In one embodiment, signals generated by assembly 70 may be incorporated as part of a security system that may be monitored by a central monitoring station. The central monitoring station may include operators that provide emergency dispatch services. An operator at the central monitoring station may also attempt to verify the authenticity of a received alarm signal based on a position of the door or a position of the lock. In one embodiment, the alarm signal generated by assembly 70 is first transmitted to a user, using either a short range or long range communication protocol, who then may forward the alarm signal to a monitoring station if authentic or cancel the alarm signal if the alarm is not valid.

In one embodiment, assembly may communicate with a building control or security system by communicating using transceiver 35. For example, assembly 70 may operate as an auxiliary input to a building control or security system. In which case, if assembly 70 detects a security event, by way of a sensor as part of, or coupled to assembly 70, then an alarm signal is transmitted from assembly 70, via transceiver 35, to the building security system. The building security system, if monitored by a central monitoring station, then forwards the alarm signal to the monitoring station.

In one embodiment, assembly 70 can receive a transmission from a separate building control or security system. If the building security system detects an alarm condition, then the security system can, for example, instruct assembly 70 to toggle from locked to unlocked or from an unlocked to locked position. Alternatively, assembly 70 can establish communications with a predetermined remote device or a central monitoring service.

Door Latch Operation

In one embodiment, the present subject matter may also be adapted for operating a door latch bolt. A system having an actuator, position sensor and transceiver, as described above, may be coupled to a door for electrically operating a door bolt or latch. A weak spring may be installed for automatically displacing the door once the latch has been withdrawn from the door jam. Position sensors such as described above can be used to sense the position of the actuator and the transceiver can communicate the position to a remote device. Thus, the latched or unlatched state of the door can be controlled and sensed remotely.

Both the door latch and lock system described herein can be implemented in a particular installation. In such an installation, a remote user can monitor the position of a door and the door lock as well as control the operation of both the door latch (and thus, the door) and the door lock.

Conclusion

Present electronic access and security systems do not provide a low-cost retrofit electrical lock system nor a system for providing more advanced door state information. Accordingly, the inventors have developed an electronic lock control and sensor module for a wireless system.

One aspect of the present system provides an electronically controllable door lock. In one embodiment, a lock system includes a cylindrical door lock having a latching spindle and an opening spindle which are concentrically oriented, and a wireless communication system to transmit signals indicating the relative positions of the latching spindle and the opening spindle. One embodiment includes a door lock assembly having a lock mechanism for placing the lock assembly into an unlocked state or a locked state, an electrically controlled actuator assembly to control the lock mechanism, a transceiver coupled to the actuator assembly, and a communication device to communicate over a two-way wireless network with the electrically controlled actuator. One embodiment includes a retrofit actuator assembly adapted to be mounted on an existing lock to control a locking mechanism of the lock, and a two-way communication device to control the retrofit actuator assembly and to receive signals from the retrofit actuator assembly indicating a state of the locking mechanism.

Another aspect of the present system provides an entry door security system. In one embodiment, a security system includes an electronically controllable door lock mechanism for putting a door into an unlocked state or a locked state and a central host system for controlling a state of the door lock mechanism, wherein the central host system communicates with the electrically controllable door lock mechanism via a wireless network.

Among other advantages, the present system provides a low-cost, full-featured security system, a low-cost electronic access system, a low-power electronic access system, a retrofit assembly for changing a standard residential cylindrical door lock into an electrically controllable door lock, means to sense and control the locking mechanism of a door lock, and/or means for providing a manually overridable electric lock assembly.

The above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A retrofit assembly for a cylindrical door lock of the type having an opening spindle for controlling a latch bolt of the door lock and having a latching spindle coaxial with the opening spindle which controls a lock mechanism of the door lock when rotated relative to the opening spindle, the retrofit assembly comprising:

an electronically controllable actuating member couplable to the latching spindle and adapted to be positioned on the cylindrical door lock such that the opening spindle is engageable with an inner door knob of the cylindrical door lock;

wherein the actuating member rotates the latching spindle relative to the opening spindle when an appropriate electronic signal is received by the actuating member, the rotation causing the lock mechanism to go into an unlocked or a locked state, wherein the actuating member includes a stator which is coupled to the opening spindle and which is rotatable relative to the latching spindle, the actuating member further includes a rotor which is coupled to the latching spindle and which is rotatable relative to the opening spindle, wherein when the rotor rotates relative to the stator, the latching spindle rotates relative to the opening spindle.

2. The retrofit assembly of claim 1, further comprising a position sensor for sensing a position of the actuating member.

3. The retrofit assembly of claim 2, further comprising a transceiver coupled to the position sensor for sending signals to a remote device indicating a state of the actuating member as indicated by the position sensor.

4. The retrofit assembly of claim 1, further comprising a sensor for sensing whether a door the cylindrical door lock is coupled to is open or closed.

5. The retrofit assembly of claim 4, further comprising a transceiver coupled to the sensor for sending signals to a remote device indicating a state of the door.

6. The retrofit of claim 1, further comprising a transceiver for receiving signals from a remote host system and for transferring the signals to the actuating member to control the rotation of the actuating member.

7. The retrofit assembly of claim 1, wherein the actuating member receives electrical power only when the actuating member is rotating the latching spindle.

8. A retrofit assembly for a cylindrical door lock of the type having an opening spindle for controlling a latch bolt of the door lock and having a latching spindle coaxial with the opening spindle which controls a lock mechanism of the door lock when rotated relative to the opening spindle, the retrofit assembly comprising:

an electronically controllable actuating member couplable to the latching spindle and adapted to be positioned on the cylindrical door lock such that the opening spindle is engageable with an inner door knob of the cylindrical door lock;

wherein the actuating member rotates the latching spindle relative to the opening spindle when an appropriate electronic signal is received by the actuating member, the rotation causing the lock mechanism to go into an unlocked or a locked state, wherein the actuating member includes a first collar dimensioned to freely rotate around the opening spindle and a second collar which is keyed to fit around the opening spindle.

9. A retrofit assembly for a cylindrical door lock of the type having an opening spindle for controlling a latch bolt of the door lock and having a latching spindle coaxial with the opening spindle which controls a lock mechanism of the door lock when rotated relative to the opening spindle, the retrofit assembly comprising:

an electronically controllable actuating member couplable to the latching spindle and adapted to be positioned on the cylindrical door lock such that the opening spindle is engageable with an inner door knob of the cylindrical door lock;

wherein the actuating member rotates the latching spindle relative to the opening spindle when an appropriate electronic signal is received by the actuating member, the rotation causing the lock mechanism to go into an unlocked or a locked state, wherein the latching spindle is also rotatable by a key from one side of the door lock and rotatable by a manual locking member from a second side of the door lock.

10. A retrofit assembly for a cylindrical door lock of the type having an opening spindle for controlling a latch bolt of the door lock and having a latching spindle coaxial with the opening spindle which controls a lock mechanism of the door lock when rotated relative to the opening spindle, the retrofit assembly comprising:

an electronically controllable actuating member couplable to the latching spindle and adapted to be positioned on the cylindrical door lock such that the opening spindle is engageable with an inner door knob of the cylindrical door lock;

wherein the actuating member rotates the latching spindle relative to the opening spindle when an appropriate electronic signal is received by the actuating member, the rotation causing the lock mechanism to go into an unlocked or a locked state, wherein the actuating member includes a sleeve positioned around the latching spindle and located between the opening spindle and the latching spindle, the sleeve having an arm for driving the rotation of the sleeve.

11. The retrofit assembly of claim 10, wherein the actuating member includes a gear which freely rotates around the opening spindle and includes a drive pin which engages the arm of the sleeve to rotate the sleeve when the gear rotates.

12. A cylindrical door lock comprising:

a first handle and a second handle which are mountable on opposing sides of a door;

an opening spindle which retracts a latch bolt of the cylindrical door lock in response to a rotation of either the first handle or the second handle;

a lock mechanism attached to the opening spindle, wherein the first handle is not rotatable when the lock mechanism is in a locked state;

a latching spindle coaxial with the opening spindle and which when rotated relative to the opening spindle causes the lock mechanism to alternately go into an unlocked state or the locked state, the first handle including a keyway for inserting a key to control the latching spindle, the second handle including a manual locking member for manually controlling the latching spindle;

means for electronically controlling the rotation of the latching spindle relative to the opening spindle;

a position sensor for sensing a position of the actuating member; and means for sending signals to a remote communications device indicating a state of the actuating member as indicated by the position sensor.

13. The cylindrical door lock of claim 12, wherein means for electronically controlling includes an electronically controllable actuating member coupled to the latching spindle, wherein the actuating member rotates the latching spindle relative to the opening spindle when an appropriate electronic signal is received by the actuating member.

14. The cylindrical door lock of claim 13, wherein the electronically controllable actuating member includes a stator which is coupled to the opening spindle and which is rotatable relative to the latching spindle, the electronically controllable actuating member further includes a rotor which is coupled to the latching spindle and which is rotatable relative to the opening spindle, wherein when the rotor rotates relative to the stator, the latching spindle rotates relative to the opening spindle.

15. The cylindrical door lock of claim 13, wherein the electronically controllable actuating member includes a gear freely rotatable around the opening spindle, the gear for driving a sleeve coupled to the latching spindle.

16. The cylindrical door lock of claim 12, further comprising means for receiving signals from a remote system, the signals for controlling the rotation of the latching spindle relative to the opening spindle.

17. A method for retrofitting a cylindrical door lock of the type having a latching spindle which controls a lock mechanism of the cylindrical door lock when rotated relative to an opening spindle of the cylindrical door lock, the method comprising:

installing an electronically controllable actuating member on the latching spindle so that the opening spindle includes an exposed end for engaging with an inner door knob, wherein the actuating member rotates the latching spindle relative to the opening spindle when an appropriate electronic signal is received by the actuating member which causes the lock mechanism to go into an unlocked or a locked state, wherein installing includes slide fitting a first collar around the opening spindle, wherein the first collar includes a keyed hole dimensioned to couple the first collar with the opening spindle, wherein installing further includes slide fitting a second collar around the opening spindle, the second collar including a hole which is dimensioned so that the second collar freely rotates around the opening spindle, the second collar including an adapter member which couples with the latching spindle to rotate the latching spindle.

18. A method for retrofitting a cylindrical door lock of the type having a latching spindle which controls a lock mechanism of the cylindrical door lock when rotated relative to an opening spindle of the cylindrical door lock, the method comprising:

installing an electronically controllable actuating member on the latching spindle so that the opening spindle includes an exposed end for engaging with an inner door knob, wherein the actuating member rotates the latching spindle relative to the opening spindle when an appropriate electronic signal is received by the actuating member which causes the lock mechanism to go into an unlocked or a locked state, wherein installing includes slide fitting a sleeve around the latching spindle so that it is positioned between the latching spindle and the opening spindle.

19. A lock system comprising:

a cylindrical door lock of the type having an opening spindle for controlling a latch bolt of the door lock and having a latching spindle coaxial with the opening spindle which controls a lock mechanism of the door lock when rotated relative to the opening spindle, wherein the latching spindle is rotatable by a manually operated key from a first side of the door lock and by a manual operated locking member on a second side of the door lock; and an electrically controlled actuator assembly mountable to the cylindrical door lock to electrically control the rotation of the latching spindle relative to the opening spindle, wherein the electrically controlled actuator assembly is positioned such that it does not interfere with operation of the manually operated key or the manual operated locking member.

20. The lock system of claim 19, wherein the lock system includes a sensor to detect a rotation of the latching spindle relative to the opening spindle.

21. The lock system of claim 20, wherein the actuator assembly includes a detectable portion used by the sensor to detect movement of a portion of the actuator assembly, wherein the detectable portion moves when the actuator assembly is electrically actuated and the detectable portion moves when the door lock is operated by the key or the manual operated locking member.

* * * * *

UNITED STATES PATENT AND TRADEMARK OFFICE

CERTIFICATE OF CORRECTION

PATENT NO. : 6,967,562 B2 
DATED : November 22, 2005
INVENTOR(S) : Menard et al.

It is certified that error appears in the above-identified patent and that said Letters Patent is hereby corrected as shown below:

Column 20,
Line 4, after "retrofit" insert -- assembly --.

Signed and Sealed this

Seventh Day of March, 2006

JON W. DUDAS
*Director of the United States Patent and Trademark Office*